(12) United States Patent
Hakkani-Tur et al.

(10) Patent No.: US 12,087,288 B2
(45) Date of Patent: Sep. 10, 2024

(54) LANGUAGE UNDERSTANDING AND DIALOGUE STATE TRACKING IN DIALOGUE SYSTEMS

(71) Applicant: Google LLC, Mountain View, CA (US)

(72) Inventors: Dilek Hakkani-Tur, Los Altos, CA (US); Abhinav Kumar Rastogi, Santa Clara, CA (US); Raghav Gupta, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 642 days.

(21) Appl. No.: 17/273,555

(22) PCT Filed: Sep. 4, 2019

(86) PCT No.: PCT/US2019/049471
§ 371 (c)(1),
(2) Date: Mar. 4, 2021

(87) PCT Pub. No.: WO2020/051192
PCT Pub. Date: Mar. 12, 2020

(65) Prior Publication Data
US 2021/0217408 A1      Jul. 15, 2021

Related U.S. Application Data

(60) Provisional application No. 62/727,833, filed on Sep. 6, 2018.

(51) Int. Cl.
*G10L 15/18* (2013.01)
*G06F 40/117* (2020.01)
(Continued)

(52) U.S. Cl.
CPC ........ *G10L 15/1815* (2013.01); *G06F 40/117* (2020.01); *G06F 40/284* (2020.01);
(Continued)

(58) Field of Classification Search
CPC ..... G10L 15/1815; G10L 15/16; G10L 15/22; G10L 2015/223; G10L 2015/226;
(Continued)

(56) References Cited

U.S. PATENT DOCUMENTS 10,878,808 B1 *  12/2020  Mathias ................. G10L 15/22
10,896,295 B1 *   1/2021  Shenoy ................ G10L 15/187
(Continued)

OTHER PUBLICATIONS

Bapna et al., "Sequential dialogue context modeling for spoken language understanding," arXiv preprint arXiv:1705.03455, May 2017, 12 pages.
(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on computer storage media for dialogue systems. A transcription of a user utterance is obtained. The transcription of the utterance is tokenized to identify multiple tokens for the utterance. Token-level utterance encodings corresponding to different tokens of the transcription are generated. A system action encoding from data indicating system actions previously performed by the dialogue system are generated. A dialogue context vector based on the utterance encoding and the system action encoding are generated. The token-level utterance encodings, the system action encoding, and the dialogue context vector are processed using a slot tagger to produce token-level output vectors. A limited set of candidate token classifications for the tokens of the user utterance are determined based on the token-level utterance encodings. A response for output is provided in response to the user utterance.

20 Claims, 8 Drawing Sheets

(51) Int. Cl.

| | |
|---|---|
| *G06F 40/284* | (2020.01) |
| *G06F 40/35* | (2020.01) |
| *G06N 3/02* | (2006.01) |
| *G10L 15/16* | (2006.01) |
| *G10L 15/22* | (2006.01) |

(52) U.S. Cl.
CPC .............. *G06F 40/35* (2020.01); *G06N 3/02* (2013.01); *G10L 15/16* (2013.01); *G10L 15/22* (2013.01)

(58) Field of Classification Search
CPC ...... G06F 40/117; G06F 40/284; G06F 40/35; G06N 3/02
See application file for complete search history.

(56) References Cited

U.S. PATENT DOCUMENTS

| 10,949,016 | B2* | 3/2021 | Teranishi | G06F 3/0445 |
|---|---|---|---|---|
| 2007/0203869 | A1* | 8/2007 | Ramsey | G06F 40/35 706/52 |
| 2019/0213284 | A1* | 7/2019 | Anand | G06F 3/0484 |
| 2019/0325081 | A1* | 10/2019 | Liu | G06F 3/011 |

OTHER PUBLICATIONS

Bengio et al., "Scheduled sampling for sequence prediction with recurrent neural networks," arXiv preprint arXiv:1506.03099, Jun. 2015, 9 pages.
Bhargava et al., "Easy contextual intent prediction and slot detection," 2013 ieee international conference on acoustics, speech and signal processing, May 2013, 8337-8341.
Chen et al., "End-to-end memory networks with knowledge carry-over for multi-turn spoken language understanding," Interspeech, Sep. 2016, 3245-3249.
Cho et al., "Learning phrase representations using RNN encoder-decoder for statistical machine translation," arXiv preprint arXiv:1406.1078, Jun. 2014, 15 pages.
Dauphin et al., "Zero-shot learning for semantic utterance classification," arXiv preprint arXiv:1401.0509, Dec. 2013, 9 pages.
Dhingra et al., "Towards end-to-end reinforcement learning of dialogue agents for information access," arXiv preprint arXiv:1609.00777, Sep. 2016, 12 pages.
Gupta et al., "An efficient approach to encoding context for spoken language understanding," arXiv preprint arXiv:1807.00267, Jul. 2018, 5 pages.
Hakkani-Tür et al., "Multi-domain joint semantic frame parsing using bi-directional rnn-lstm," Interspeech, Sep. 2016, 715-719.
Henderson et al., "The second dialog state tracking challenge," Proceedings of the 15th Annual Meeting of the Special Interest Group on Discourse and Dialogue, Jun. 2014, 10 pages.
Henderson et al., "Word-based dialog state tracking with recurrent neural networks," Proceedings of the 15th Annual Meeting of the Special Interest Group on Discourse and Dialogue (SIGDIAL), Jun. 2014, 292-299.
Hochreiter et al., "Long short-term memory," Neural computation, Nov. 1997, 9(8):1735-80, 32 pages.
Kingma et al., "Adam: a method for stochastic optimization," arXiv preprint arXiv:1412.6980, Dec. 2014, 15 pages.
Liu et al., "An end-to-end trainable neural network model with belief tracking for task-oriented dialog," arXiv preprint arXiv:1708.05956, Aug. 2017, 5 pages.
Liu et al., "Attention-based recurrent neural network models for joint intent detection and slot filling," arXiv preprint arXiv:1609.01454, Sep. 2016, 5 pages.
Liu et al., "Joint online spoken language understanding and language modeling with recurrent neural networks," arXiv preprint arXiv:1609.01462, Sep. 2016, 9 pages.
Mrkšić et al., "Neural belief tracker: Data-driven dialogue state tracking," arXiv preprint arXiv:1606.03777, Jun. 2016, 12 pages.
PCT International Preliminary Report on Patentability in International Appln. No. PCT/US2019/049471, dated Sep. 6, 2018, 9 pages.
PCT International Search Report and Written Opinion in International Appln. No. PCT/US2019/049471, dated Nov. 29, 2019, 15 pages.
Perez et al., "Dialog state tracking, a machine reading approach using memory network," arXiv preprint arXiv:1606.04052, Jun. 2016, 10 pages.
Rastogi et al., "Scalable multi-domain dialogue state tracking," 2017 IEEE Automatic Speech Recognition and Understanding Workshop (ASRU), Dec. 2017, 561-568.
Sang et al., "Introduction to the CoNLL-2000 shared task: Chunking," arXiv preprint cs/0009008, Sep. 2000, 6 pages.
Schuster et al., "Bidirectional recurrent neural networks," IEEE transactions on Signal Processing, Nov. 1997, 45(11):2673-81.
Shah et al., "Building a conversational agent overnight with dialogue self-play," arXiv preprint arXiv:1801.04871, Jan. 2018, 11 pages.
Su et al., "How time matters: Learning time-decay attention for contextual spoken language understanding in dialogues," Proceedings of the 2018 Conference of the North American Chapter of the Association for Computational Linguistics: Human Language Technologies, Jun. 2018, 2133-2142.
Sukhbaatar et al., "End-to-end memory networks," arXiv preprint arXiv:1503.08895, Mar. 2015, 11 pages.
Thomson et al., "Bayesian update of dialogue state: a POMDP framework for spoken dialogue systems," Computer Speech & Language, Oct. 2010, 24(4):562-88, 39 pages.
Wang et al., "A simple and generic belief tracking mechanism for the dialog state tracking challenge: on the believability of observed information," Proceedings of the SIGDIAL 2013 Conference, Aug. 2013, 423-432.
Williams et al., "Multi-domain learning and generalization in dialog state tracking," Proceedings of the SIGDIAL 2013 Conference, Aug. 2013, 433-441.
Williams et al., "Partially observable Markov decision processes for spoken dialog systems," Computer Speech & Language, Apr. 2007, 21(2):393-422.
Williams et al., "Web-style ranking and SLU combination for dialog state tracking," Proceedings of the 15th Annual Meeting of the Special Interest Group on Discourse and Dialogue (SIGDIAL), Jun. 2014, 282-291.
Xu et al., "Contextual domain classification in spoken language understanding systems using recurrent neural network," 2014 IEEE International Conference on Acoustics, Speech and Signal Processing (ICASSP), May 2014, 136-140.
Xu et al., "Convolutional neural network based triangular crf for joint intent detection and slot filling," 2013 IEEE workshop on automatic speech recognition and understanding, Dec. 2013, 78-83.
Yoshino et al., "Dialogue state tracking using long short term memory neural networks," Proceedings of Seventh International Workshop on Spoken Dialog Systems, Jan. 2016, 1-8.
Zhang et al., "A joint model of intent determination and slot filling for spoken language understanding," IJCAI, Jul. 2016, 16:2993-2999.

* cited by examiner

| | | |
|---|---|---|
| 202 | System: | Hello! How can I help? |
| 204 | Acts: | *greeting* |
| 206 | User: | Hello, book me a table for two at Cascal. |
| 208 | Intent: | RESERVE_RESTAURANT |
| 210 | Acts: | *greeting, inform(#people), inform(restaurant)* |
| 212 | State: | restaurant=Cascal, #people=two |
| 214 | System: | I found a table for two at Cascal at 6 pm. Does that work? |
| 216 | Acts: | *offer(time=6 pm)* |
| 218 | User: | 6 pm isn't good for us. How about 7 pm? |
| 220 | Acts: | *negate(time), inform(time)* |
| 222 | State: | restaurant=Cascal, #people=two, time=7 pm |

FIG. 2

LANGUAGE UNDERSTANDING AND DIALOGUE STATE TRACKING IN DIALOGUE SYSTEMS

CROSS-REFERENCE TO RELATED APPLICATION

This application is a National Stage Application under 35 U.S.C. § 371 and claims the benefit of International Application No. PCT/US2019/049471, filed Sep. 4, 2019, which claims priority to U.S. Application No. 62/727,833, filed Sep. 6, 2018, the disclosure of which is incorporated herein by reference.

BACKGROUND

This specification relates generally to task-oriented dialogue systems using machine learning.

SUMMARY

Multi-task learning of language understanding (LU) and dialogue state tracking (DST) in task-oriented dialogue systems techniques are described below. Multi-task training enables the sharing of the neural network layers responsible for encoding a user utterance for both LU and DST and improves performance while reducing the number of network parameters. In the framework described below, DST operates on a set of candidate values for each slot. These candidate sets are generated using LU slot annotations for the current user utterance, dialogue acts corresponding to the preceding system utterance, and the dialogue state estimated for the previous turn, enabling DST to handle slots with a large or unbounded set of possible values and deal with slot values not seen during training. Furthermore, to bridge the gap between training and inference, scheduled sampling on LU output for the current user utterance is utilized, as well as the DST output for the preceding turn.

In general, one innovative aspect of the subject matter described in this specification can be embodied in methods that include the actions of obtaining, by the one or more computers of the dialogue system, a transcription of a user utterance; tokenizing, by the one or more computers of the dialogue system, the transcription of the utterance to identify multiple tokens for the utterance; generating, by the one or more computers of the dialogue system, token-level utterance encodings corresponding to different tokens of the transcription, the token-level utterance encodings being generated using an utterance encoder comprising one or more recurrent neural network layers; generating, by the one or more computers of the dialogue system, a system action encoding from data indicating system actions previously performed by the dialogue system, the system action encoding being generated using a system action encoder comprising one or more neural network layers; generating, by the one or more computers of the dialogue system, a dialogue context vector based on the utterance encoding and the system action encoding, the dialogue context vector being generated using a dialogue state encoder comprising one or more recurrent neural network layers; processing, by the one or more computers of the dialogue system, the token-level utterance encodings, the system action encoding, and the dialogue context vector using a slot tagger comprising one or more recurrent neural network layers to produce token-level output vectors; determining, by the one or more computers of the dialogue system, a limited set of candidate token classifications for the tokens of the user utterance based on the token-level utterance encodings; and providing, by the one or more computers of the dialogue system, a response for output in response to the user utterance, the response being generated based on an interpretation of the user utterance determined using the limited set of candidate token classifications.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates a dialogue between a user of a client device and the dialogue server.

Like reference numbers and designations in the various drawings indicate like elements.

DETAILED DESCRIPTION

Figure 1:
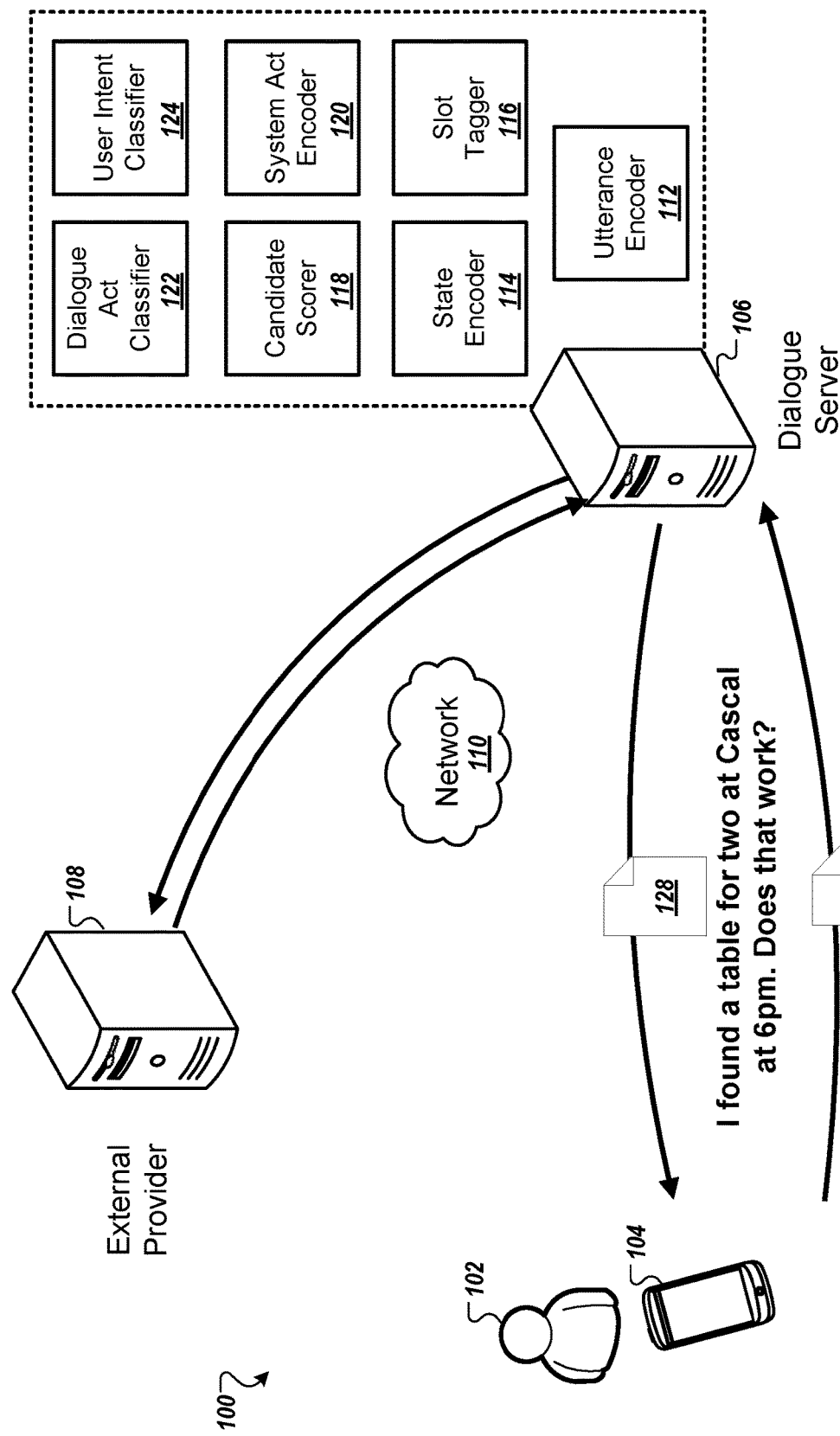
FIG. 1 illustrates an example of a system for joint language understanding and dialogue systems.

FIG. 1 illustrates an example of a system 100 for joint language understanding and dialogue systems. The system 100 includes a client device 104, a dialogue server 106, an external provider 108, and a network 110. The dialogue server 106 can include one or more computers connected locally or over a network. The dialogue server 106 includes an utterance encoder 112, a state encoder 114, a slot tagger 116, a candidate scorer 118, a system act encoder 120, a dialogue act classifier 122, and a user intent classifier 124. The utterance encoder 112, the state encoder 114, the slot tagger 116, the candidate scorer 118, the system act encoder 120, the dialogue act classifier 122, and the user intent classifier 124 can be implemented in software, hardware, firmware, or a combination thereof. For example, these elements 112, 114, 116, 118, 120, 122, and 124 can be implemented using neural networks.

In general, the input to the dialog system is a user utterance. The user utterance may comprise natural language input, which may be derived from audio data representing speech of a user. That is, in various embodiments, audio data representing speech of a user may be received at a speech recognition module which is configured to process the audio data to generate natural language input, which may comprise a user utterance, e.g., in the form of raw text. Moreover, in some implementations, an audio response in the form of synthesized speech may be provided in response to the received audio data.

The user utterance is converted into a real number embedding vector, using an utterance encoder. This can be a bi-directional recurrent neural network with GRU cells. The utterance encoder produces token-level output vectors as well as a final embedding vector encoding the entire utterance. This type of network has been shown to model long-range dependencies in the input text well.

Next, a system act encoder converts dialog actions performed by the system into a real embedding. The input to this step can be an unordered list of system actions that immediately preceded the user utterance. These can include, but are not limited to, requesting certain inputs from the user (as in 'REQUEST(movie name)'), offering alternative values for slots (as in 'OFFER(time=6 pm)') et cetera. The system actions are first converted into a binary vector, where each dimension of the vector indicates the presence or absence of each possible dialogue act in our vocabulary, disregarding the slot values. Then the system act encoder, e.g., a two-layer feedforward neural network, is used to convert this binary vector to a real number embedding, which is the system act encoding.

A dialogue state encoder, e.g., a unidirectional GRU RNN, is employed to accumulate dialogue context from previous dialogue turns, with each RNN time step corresponding to a dialogue turn as opposed to positions in user utterances. At each turn, this RNN receives as input the user utterance encoding concatenated with the system act encoding. The RNN produces an output vector for each time step, which is an embedded representation of the entire dialogue context up to the current turn. The dialogue state encoder and also maintains an internal state which is updated at every dialogue turn.

A slot tagger, e.g., a bi-directional recurrent neural network using LSTM cells, is used to generate token-level output vectors used to interpret the meaning of different tokens, e.g., words, of the user utterance. The dialogue context vector from the previous turn, the system act encoding from the current turn, and the token-level output vectors from the utterance encoder are fed as input to the slot tagger.

A user intent classifier processes the dialog context vector from the dialogue state encoder at the current dialogue turn to identify the user intent and the different user dialogue acts (e.g., inform the system of something, request something, etc.) present in the user utterance. The token-level outputs from the slot tagger are used to identify a first set of candidate slot values, e.g., slot classifications such as whether a word represents a restaurant name, a number of people for a reservation, etc., for the user utterance. In general, a slot can represent a token or portion of an utterance or dialogue. In some implementations, every word or token of an utterance can be considered a different slot to be evaluated and classified. The slots can serve fields or elements that make up a definition of an action or request. The slots can be assigned tags (e.g., classification labels or values) that indicate a semantic meaning for the element, such as a manner in which a natural language text element should be interpreted. Examples of classifications or tags for slots include specifying a word as a number, a beginning of a restaurant name, an intermediate word of a restaurant name, a beginning of a name of a person, an intermediate word of a person's name, a location, a time (or more specifically, a term representing an hour, minute, day, month, year, etc.), and so on.

The first set of candidate slot values identified in the previous step is modified to generate a second set of candidate slot values. For example, local conversation context and potentially other knowledge sources are used to expand or to filter the first set of slot values. A candidate scorer module can determine the second set of candidate slot values, for example, by scoring different options and selecting only candidates that have at least a minimum likelihood score.

A dialogue state tracker performs tracking on only the limited set of candidates in the second set, resulting in an approach scalable to large and rich datasets. For each slot present in the dialogue, the dialogue state tracker runs a 2-layer feedforward network on utterance-level, slot-level and candidate-level features extracted for each candidate, including 'null' and 'dontcare' values, for each slot. These features are extracted from the previous dialogue state and the output vector from the state encoder. Outputs from the dialogue state tracker network are used to classify the correct candidate for each slot to obtain the new dialogue state.

During training, there are two places where the dialogue state tracking module uses its own final outputs as inputs to another stage: slot value predictions and the previous predicted dialogue state. The training process can employ scheduled sampling to gradually have the model train on its own predictions, after training initially on the ground truth slot values and dialogue state.

The techniques for integrating SLU and DST can provide a number of benefits. For example, maintaining SLU and DST as separate systems would involve different networks for extracting features from raw text inputs. The present architecture avoids this duplication by employing the same network for extracting features for both SLU and DST tasks, leading to a potentially faster model with fewer parameters.

Both SLU and DST need context from prior dialogue history in order to make accurate predictions. However, disjoint systems for the two tasks would end up separate context representations, which is again not computationally efficient. The present architecture counters this by using dialogue context embedded in the state encoder for both SLU and DST, yielding a model with fewer parameters.

Some prior systems utilize variants of end-to-end memory networks to obtain prior dialogue context. These store previous raw user and system utterances in memory and, for each dialogue turn, encode prior utterances using an RNN or otherwise, and then compute an attention-weighed representation of the history utterances, with an encoding of the current user utterance as the context vector. That approach includes redundancy as it processes multiple user and system utterances at every dialogue turn, and the mathematical operations involved are computationally expensive. By contrast, in the present architecture, using the state encoder produces a compact context representation that is also computationally cheap to produce and update with each dialogue turn.

Some prior approaches to SLU and DST exclusively use the ground truth slot values and previous dialogue state at each turn. However, during inference time, the model is required to operate on its own predictions for these two outputs, ultimately leading to lower accuracy. In the present architecture, using scheduled sampling during training bridges this gap between training-time and inference-time behavior, yielding a model that is more robust to errors at inference time.

The example of FIG. 1 shows the dialogue server 106 processing an input phrase 126 (e.g., representing spoken or typed user input) from a client device 104 associated with a user 102. In the example, the dialogue server 106 shown in FIG. 1 receives the input phrase 126 from the client device 104, processes the input phrase 126 to determine its intent, and provides an output phrase 128 based on the dialogue server's 106 interpretation the input phrase 126's intent. The dialogue server 106 processes the input phrase 126 and provides, as a response, an output phrase 128, as further described below.

In other implementations, the dialogue server 106 can receive an input phrase from the external provider 108 and output a response to provide back to the external provider 108. The client device 104 can transmit the input phrase 126 and receive the output phrase 128 over the network 110. Alternatively, the dialogue server 106 can be implemented in the client device 104. Similarly, the external provider 108 can transmit an input phrase over the network 110 to the dialogue server 106. Additionally, the dialogue server 106 can be implemented in the external provider 108.

In some implementations, the user 102 can input the phrase 126 to the client device 104. For example, the user 102 can speak a phrase, such as "Hello, book me a table for two at Cascal" to an application of the client device 104, the client device 104 converts the spoken phrase into data to transmit. In another example, the user 102 can type the phrase, e.g., "Hello, book me a table for two at Cascal" into the application of the client device 104 using a touch-screen or keyboard of the client device 104. The application of the client device 104 can indicate the dialogue server 106's response or output phrase 128 on a display of the client device 104. For example, as shown in FIG. 1, the output phrase 128 can include "I found a table for two at Cascal at 6 pm. Does that work?"

The system 100 allows for continuing conversations with user 102 after a first output phrase has been received at the client device 104. For example, after the client device receives the output phrase "I found a table for two at Cascal at 6 pm. Does that work?" the user 102 can respond with "Yes" on the application on the client device 104. The user 102 can speak a response or type the response on the application on the client device 104. Alternatively, the user 102 can respond with "Can you find a later time than 6 pm at Cascal?" to provide to the dialogue server 106. The dialogue server 106 can provide a response with a new table reservation time for two at Cascal later than 6:00 PM or otherwise, indicate no other table reservation time exists for two after 6:00 PM. In other implementations, the dialogue server 106 can respond to other dialogue requests from users. For example, the dialogue server 106 can respond to query requests from users on the internet, query requests from users on the telephones, application requests from other client devices, and requests from databases corresponding to other external networks.

In some implementations, as noted above, the dialogue server 106 can interpret user inputs and determine the meaning of the input in the context of a dialogue using an utterance encoder 112, a state encoder 114, a slot tagger 116, a candidate scorer 118, a system act encoder 120, a dialogue act classifier 122, and a user intent classifier 124. Processing is generally done in increments referred to as "turns," which each turn including a set of system acts (e.g., outputs to the user) and the subsequent user response. Thus, processing is done for each user input (e.g., each sentence or request), in the context of the most recent actions by the system, including outputs to the user. As discussed below, the overall context of the entire dialogue, e.g., information about system actions and user inputs for previous turns, is also used. Similarly, some elements of the system may act on individual tokens of a user input and so generate multiple token-level outputs for each dialogue turn.

The utterance encoder 112 includes a single layer bidirectional gate recurrent unit (GRU) recurrent neural network (RNN). The utterance encoder 112 is trained to receive a user utterance, tokenize the user utterance, and output representations of the tokenized user utterance. The utterance encoder 112 receives the user utterance, such as input phrase 126, tokenizes the user utterance. For example, the input phrase 126 "Hello, book me a table for two at Cascal" would be tokenized in the following format—["Hello", "book", "me", "a", "table", "for", "two", "at", "Cascal" ]. The utterance encoder adds special tokens to the beginning and end of the tokenized list. For example, the special token "SOS" (meaning start of sentence) is added to the beginning of the list and the special token "EOS" (meaning end of sentence) is added to the end of the list, like so—["SOS", "Hello", "book", "me", "a", "table", "for", "two", "at", "Cascal", "EOS" ]. The utterance encoder 112 uses the single layer bi-directional GRU RNN to encode the user utterance to various output representations. For example, the single layer bi-directional GRU RNN outputs a first representation of the entire tokenized user utterance compacted together as the concatenation of the final states of the two RNNs found in the utterance encoder 112. The second output of the utterance encoder 112 is an embedded representation of each token in the list of the user utterance. The embedded representation can be the concatenation of outputs at each step of the forward and backward layer of the single layer bidirectional gate GRU RNN.

The state encoder 114 includes a unidirectional GRU RNN. At each input from the tokenized list, the state encoder 114 generates an embedded representation of a dialogue context of the user utterance. The state encoder 114 dialogue context is a generated summary of the entire observed dialogue between the user 102 and the dialogue server 106. The state encoder 114 takes in inputs from the utterance encoder 112's output, outputs from the system act encoder, a previous state values of the state encoder 114 to produce an encoded representation of the dialogue context of the user.

The slot tagger 116 includes a single layer bidirectional long short term memory (LSTM) neural network. The slot tagger 116 receives the contextual token embeddings as input from the utterance encoder 112 and outputs refined tokens. The output refined tokens include identifiers for evaluating the presence of values of different slots found in the user utterance. For example, the slot tagger 116 can use in-out-begin (IOB) tagging or begin/after (BIA) tagging. The slot tagger 116 uses the IOB or BIA tagging to assign a label to each token. The labels are then used by the slot tagger 116 to extract values for different slots from the provided utterance.

The candidate scorer 118 uses a dialogue state, a dialogue context vector, and other features extracted from the current input token to update scores for candidates in the candidate set and outputs the current dialogue state. The candidate scorer 118 receives input from the state encoder 114.

The system act encoder 120 encodes the system dialogue acts for the current turn (e.g., performed between the most recent user statement and the prior user statement) to generate the system dialogue act vector $a_t$. The system act encoder 120 contains an act type, an optional slot, and value parameters. The dialogue acts are first encoded into binary vectors denoting the presence of an act type. Dialogue which does not have any associated parameters (e.g., greeting and negate) are encoded as a binary indicator vector $a_{utt}^t$. Dialogue acts with just a slot s as parameter (e.g., request(date)) are encoded as $a_{slot}^t(s)$, whereas acts having a candidate value c for a slot s as parameter (e.g., offer(time=7 pm)) are encoded as $a_{cand}^t(s, c)$.

The dialogue act classifier 122 generates scores that indicate how likely it is that a user statement represents possible user actions. The possible actions are referred to as dialogue acts, which are structured semantic representations of user utterances. The dialogue manager uses indications of which user dialogue acts have occurred in order to determine the next system action, e.g., to determine how to respond to the most recent user statement. The dialogue act classifier 122 allows for the presence of more than one dialogue act in a turn to generate probability scores. All dialogue acts having probability scores from the dialogue act classifier 122 representing a probability greater than a threshold value are indicated as occurring in the dialogue.

The user intent classifier 124 identifies the intent of the user at each turn to allow the user to switch intents during the dialogue. The user intent classifier 124 determines an intent label based on a distribution over a predetermined set of possible intents. Although the user intent may vary from one utterance to the next, each user utterance is generally assumed to represent only a single intent. Accordingly, of the various possible intent labels, the one having the highest probability score is selected as the intent for the user utterance.

Once the dialogue server 106 processes the user's input phrase 126, the dialogue server 106 generates a response to provide to the client device 104. The response may include one or more tokens concatenated together. The dialogue server 106 can provide the response in auditory or textual format to the client device 104 over network 110. The output phrase 128 can be provided to the client device 104 over the network 110 in response to receiving the input phrase 126 from the client device 104.

FIG. 2 illustrates a dialogue 200 between a client device 104 and the dialogue server 106. The dialogue includes user intent, user and system dialogue acts, and dialogue states determined by the dialogue server 106. The dialogue server 106 interacts with users with natural language systems to accomplish tasks they have in mind, by providing a natural language interface to a backend that includes an API, database, or service. The dialogue server 106 includes a language understanding (LU) component and a dialogue state tracking component (DST). The LU component estimates the semantic parse of each user utterance. The DST or belief tracking component keeps track of the conversation context and the dialogue state (DS).

For instance, as illustrated in dialogue 200, the dialogue server 106 first provides a message 202 to the client device 104 that recites "Hello! How can I help?" The dialogue server 106 determines that the act 204 of the system's message 202 is a greeting message. In response, the user 102 provides a message 206 to the dialogue server 106 that recites "Hello, book me a table for two at Cascal." The dialogue server 106 determines the intent 208 of the user's message 206 is to "RESERVE_RESTAURANT." In order for the dialogue server 106 to act on the user's intention 208, the dialogue server 106 determines acts 210 based on the intent 208 that includes one or more intentions—"greeting, inform(#people), inform(restaurant)." The acts 210 helps the dialogue server 106 determine what steps to take next. In particular, the dialogue server 106 sets its state 212 to be "restaurant=Cascal, #people=two." The dialogue server 106 uses the acts 210 and the state 212 to find a reservation for two people at Cascal from the Internet or another external provider.

The dialogue server 106 can determine a reservation time at Cascal with the desired number of persons from the acts 210 and the state 212. The dialogue server 106 generates a response 214 to provide to the client device 104. The response 214 recites "I found a table for two at Cascal at 6 pm. Does that work?" Additionally, the dialogue server 106 stores an indication of an act 216 that indicates "offer (time=6 pm)." The stored act 216 allows the dialogue server 106 to retrieve an indication of the latest act performed by the dialogue server 106 upon receiving a response from the client device 104. In particular, the dialogue server 106 receives a response 218 from the user 102 that recites "6 pm isn't good for us. How about 7 pm?" In order for the dialogue server 106 to determine the intent and context of the response 218 pertaining to the current conversation with the user 102, the dialogue server 106 analyzes the response 218 with knowledge of the state 212 and the acts 216. The dialogue server 106 determines the next acts 220 based on determining the intent of the response 218 to be "negate (time), inform(time)." Once the acts 220 are determined, the dialogue server 106 updates the state 222 of the dialogue server 106 to be "restaurant=Cascal, #people=two, time=7 pm." From FIG. 2, state 222 is more detailed than state 212 and allows the dialogue server 106 to further refine the search of a table reservation at Cascal.

Figure 3:
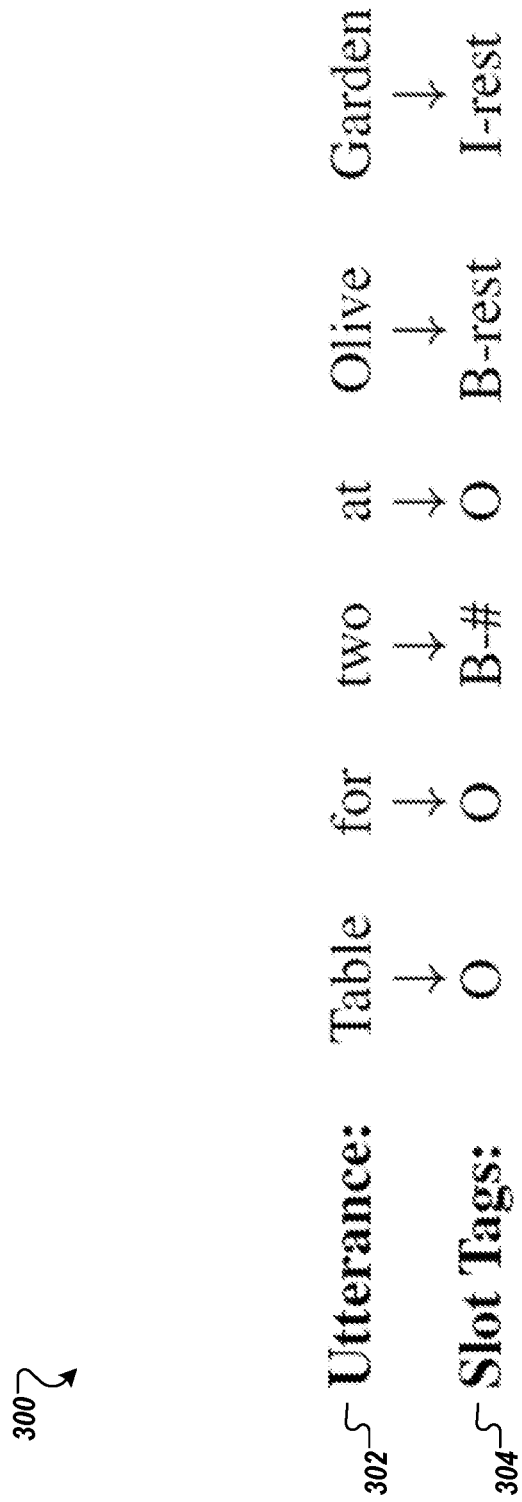
FIG. 3 illustrates an example of slot tagging for a user utterance.

FIG. 3 illustrates an example of slot tagging 300 for a user utterance. The dialogue server 106 uses LU and DST trained with multi-task learning to employ a hierarchical RNN to encode the dialogue context from user 102. The dialogue server 106 identifies intermediate features from the hierarchical RNN to encode the dialogue context. In particular, the intermediate features can be used for identifying the intent acts and dialogue acts of the user 102 and also tagging slots in the user utterance. For example, the slot tagging 300 illustrates a user utterance 302 that recites "Table for two at Olive Garden" and slot tags 304 designated by the dialogue server 106. The dialogue server 106 employs IOB slot tagging. In the IOB slot tagging functionality, "O" is a null label, "B" marks the beginning of a slot, and an "I" indicates the continuation or extension of a slot. Slots are also tagged with a semantic meaning. The semantic meanings or slot types may correspond to fields or parameters of different grammars for interpreting or responding to user utterances. For example, the different types of slots can be arguments that provide detail about dialogue acts.

The slot tags 304 illustrate the meanings with a dash and a code or abbreviation to represent the meaning of the words in the identified slot. In FIG. 3, the words in the utterance 302 are assigned slot tags 304 as follows. The word "Table" is assigned tag "O", and the word "for" is also assigned tag "O." With the null tag, these are not considered to modify or serve as a parameter for dialogue acts. The word "two" is assigned the tag "B-#," meaning that it is the beginning of a tag indicating a number. The word "at" is assigned tag "0." The word "Olive" is assigned tag "B-rest" to indicate the beginning of a restaurant name, and "Garden" is tagged "I-rest" to indicate the continuation of a restaurant name. The identified slots can be used to specify the dialogue acts for the user utterance 302. For example, the action "inform( )," meaning to inform the system of some information, can be specified as "inform(number of people)," where the number of people is 2 according to the first identified slot. Similarly the act "inform(restaurant name)" can be considered to have "Olive Garden" as the restaurant name according to the second slot identified. Once the slots are identified, the dialogue server 106 can decide on the next actions to take.

Figure 4:
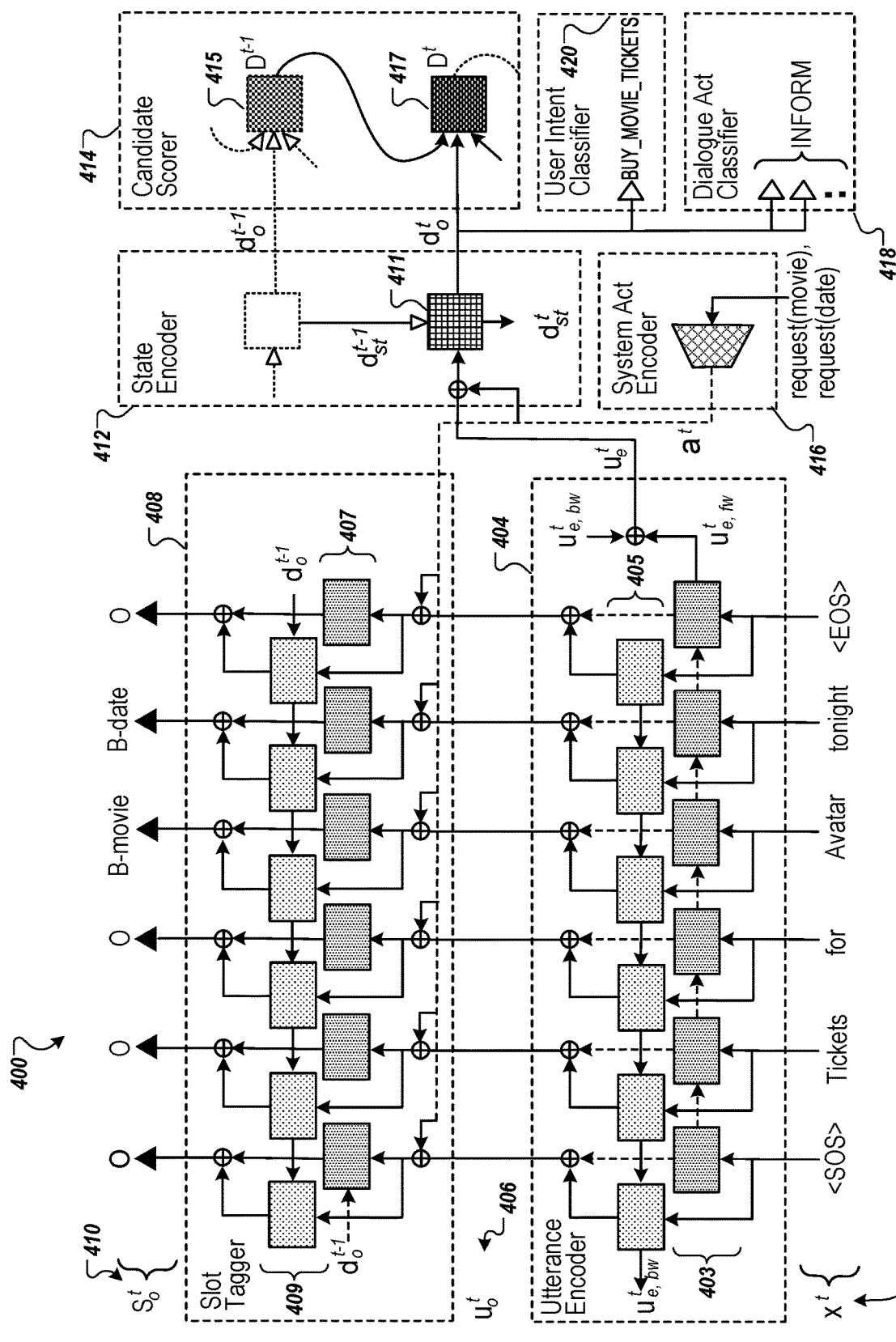
FIG. 4 illustrates an example of a system for a joint language understanding component and a dialogue state tracking component.

FIG. 4 illustrates an example of a system 400 for a joint language understanding component and a dialogue state tracking component. The system 400 includes an architecture that includes a user utterance encoder 404, a slot tagger 408, a state encoder 412, a candidate scorer 414, a system act encoder 416, a dialogue act classifier 418, and a user intent classifier 420. The dialogue sequence $x^t$ 402 includes a sequence of T turns, each turn containing a user utterance and the preceding system dialogue acts output by the dialogue manager. For example, one turn T of the dialogue sequence may include the system acknowledging a choice of cinema, followed by a user statement given by tokens "<SOS>, Tickets, for, Avatar, tonight, <EOS>." Another turn T can another phrase. At each turn, the system 400 takes a user utterance and the previous dialogue state $D^{t-1}$ as input and outputs the predicted user intent, user dialogue acts, slot values in the user utterance and updated dialogue state.

As each new turn arrives at the system 400 from the user 102, the system act encoder 416 encodes one or more system dialogue acts to generate a system dialogue act vector $a^t$. The shaded encoder of the system act encoder 416 receives the one or more system dialogue acts to generate the system dialogue act vector. For example, one or more system dialogue acts can include a request for a reservation, a request for a movie, a request for a date, and a request for a time, to name a few examples. The utterance encoder 404 similarly encodes the received user utterance $x^t$ 402 into a vector $u_e^t$ as shown in system 400. The utterance encoder 404 includes a single layer bi-direction GRU recurrent neural network (RNN) that includes a forward layer 403 and a backward layer 405. As shown in system 400, the forward layer 403 includes one or more similarly shaded blocks and the backward layer 405 includes one or more similarly shaded blocks. Additionally, the utterance encoder 404 generates contextual token embeddings $u_o^t$ 406 for each utterance token to provide to the slot tagger 408. The state encoder 412 utilizes the system dialogue act vector $a^t$, the vector $u_e^t$, and the previous turn hidden state of the state encoder 412, $d_{st}^{t-1}$ to generate a dialogue context vector $d_o^t$ and an updated hidden state vector $d_{st}^{t-1}$. The dialogue context vector $d_o^t$ summarizes the entire observed dialogue from the received user utterance $x^t$ and past user utterances/phrases or turns during that conversation from a particular user. The state encoder 412 includes a unidirectional GRU RNN 411 that generates the dialogue context vector $d_o^t$.

The candidate scorer 414, the user intent classifier 420, and the dialogue act classifier 418 each process the dialogue context vector $d_o^t$. The candidate scorer 414 includes a feedforward network 415 and a feedforward network 417 each having one hidden layer. In addition, the slot tagger 408 uses the dialogue context from the previous turn $d_o^{t-1}$ from the state encoder 412, the system dialogue act vector $a^t$, and contextual token embeddings $u_o^t$ 406 to generate refined token embeddings $s_o^t$ 410. The slot tagger 408 consists of a single-layer bidirectional LSTM RNN to generate the refined token embeddings. The slot tagger 408 includes forward LSTM recurrent units 407 and backward LSTM recurrent units 409. As shown in system 400, the forward LSTM recurrent units 407 include one or more similarly shaded blocks and the backward LSTM recurrent units 409 include one or more similarly shaded blocks. The refined token embeddings $s_o^t$ 410 can then be used to predict the slot tag for each token in the received user utterance $x^t$ 402.

The dialogue server 106 provides the system dialogue act vector $a^t$ and the predicted slot tags from the refined token embeddings $s_o^t$ 410 to the candidate scorer 414 to update the set of candidate values for each slot in the candidate scorer 414. The candidate scorer 414 uses the previous dialogue state $D^{t-1}$, the dialogue context vector $d_o^t$, and other features extracted from the current turn of the received user utterance $x^t$. The candidate scorer 414 updates the scores for all possible candidates in the candidate set and outputs an updated dialogue state $D^t$.

Figure 5:
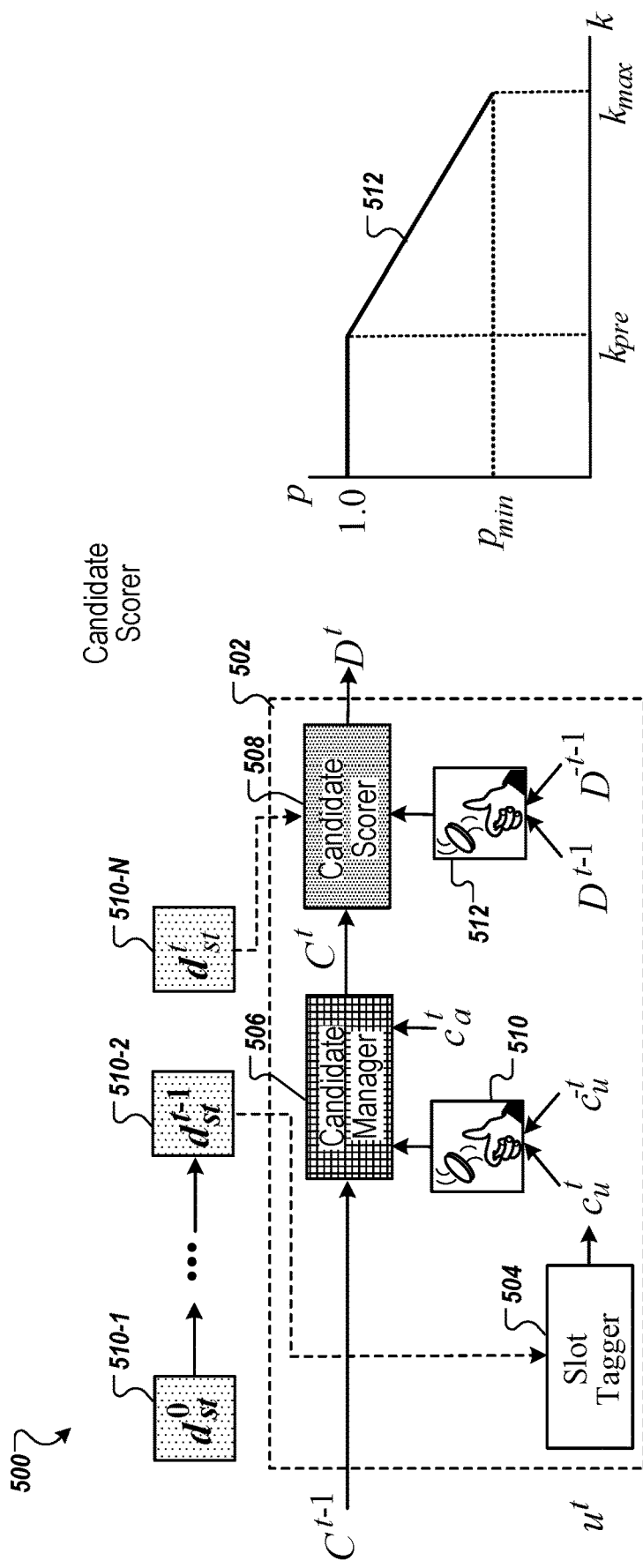
FIG. 5 illustrates an example of a system of scheduled sampling for training the candidate scorer.

FIG. 5 illustrates an example of a system 500 of scheduled sampling for training the candidate scorer 414. The system 500 uses a recurrent neural network model to train the DST. The system 500 includes a training module 502, a slot tagger 504, a candidate manger 506, and a candidate scorer 508. During training, ground truth predictions from previous turns are utilized for stability that causes a mismatch between training and inference behavior. Scheduled sampling is utilized to bridge the mismatch and has been shown to achieve improved slot tagging performance on single turn datasets, such as a received spoken user utterance. As shown in system 500, the left plot illustrates two locations, slot tagging and dialogue state, 510 and 512 to perform scheduled sampling. The plot on the right illustrates a variation of sampling probabilities $p_c$ and $p_D$ with each training step. System 500 includes similar components to system 400.

During training, the dialogue server 106 samples between ground truth slot tags $\bar{c}_u^t$ and the predicted slot tags $c_u^t$. Initially, the dialogue server 106 trains with the ground truth slot tags (i.e., with keep probability $p_c=1$) and gradually reducing $p_c$. Gradually reducing $p_c$ increasingly replaces $\bar{c}_u^t$ with $c_u^t$. As the dialogue server 106 uses the predicted slot tags during training, the DST allows for training in the presence of noisy candidate sets.

During inference, the candidate scorer 508 only has access to its own predicted scores as described in equations 13 and 14 Thus, during training, the ground truth previous scores taken from $\bar{D}^{t-1}$ (i.e. with keep probability $p_D=1$) and gradually switching to $D^{t-1}$, the predicted previous scores, reduces $p_D$.

During training, the dialogue server 106 varies as a function of training step k, as shown in 512. In particular, only ground truth slot tags and dialogue states are used for training i.e. $p_c$ and $p_D$ stay at 1.0 for the first $k_{pre}$ training steps, then $p_c$ and $p_D$ reduce to $p_{min}$ as k increases to $k_{max}$. In particular, $p_c$ and $p_D$ decrease linearly as the ground truth slot tags and states are increasingly replaced by model predictions during training.

Figure 6:
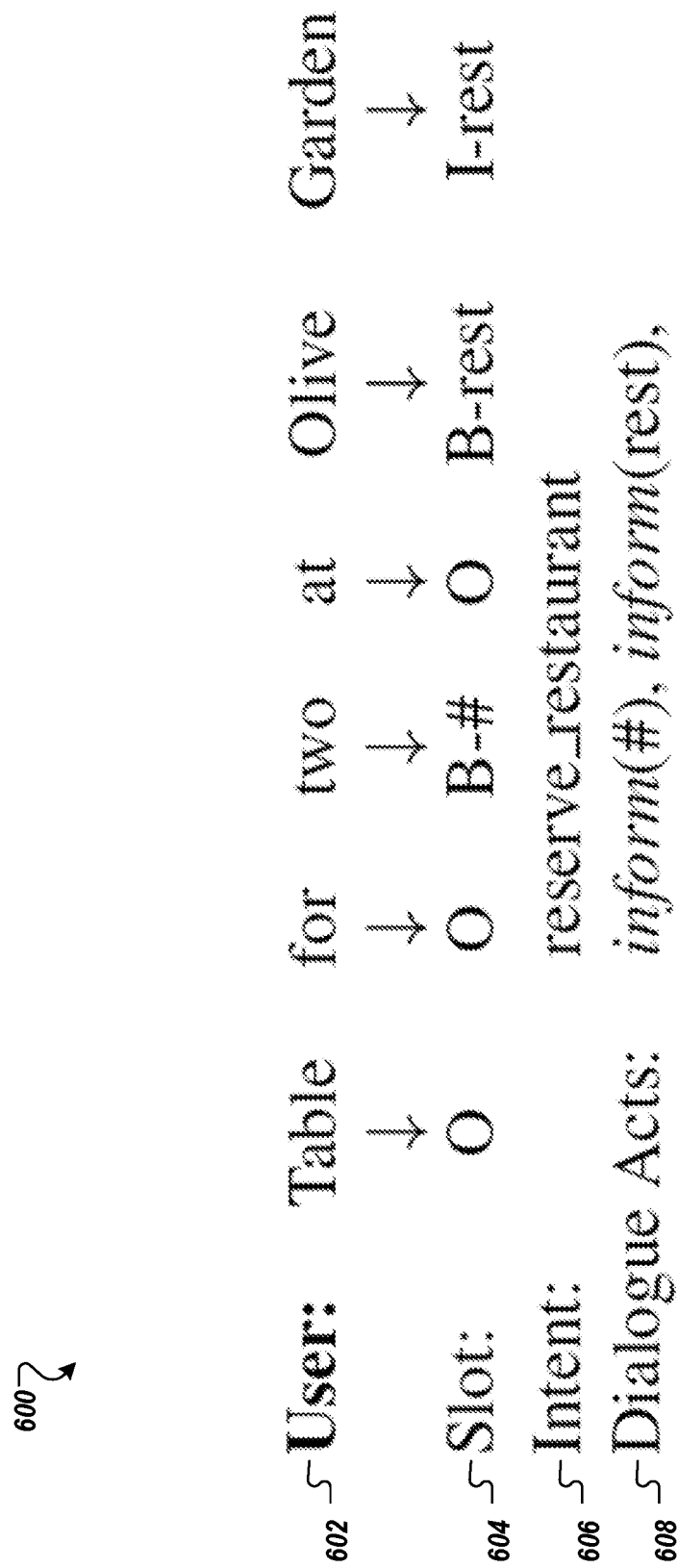
FIG. 6 illustrates another example of slot tagging for a user utterance.

FIG. 6 illustrates another example of slot tagging 600 for a user utterance. For example, the slot tagging 600 illustrates a user utterance 602 that recites "Table for two at Olive Garden" and slot tags 604 designated by the dialogue server 106. The dialogue server 106 employs IOB slot tagging that indicates "Table" as O, "for" as O, "two" as B-#, "at" as O, "Olive" as B-rest, and "Garden" as I-rest. In the IOB slot tagging functionality, "O" is indicated as the null label, an initial "B" is indicated as the beginning of a lot, and an "I" is indicated as the continuation of a slot. FIG. 6 also shows the relationship of the tagged slots 604 with the intent and the dialogue acts 608. The dialogue server 106 infers an intent 606 of "reserve_restaurant" from the user utterance 602, corresponding to a likely user intent to make a reservation at a restaurant. The dialogue server 106 also determines dialogue acts 608 which are functions performed by the user utterance, for example, to inform the system of certain information. The inferred dialogue acts 608 are "inform(#)" and "inform(rest)," meaning to inform the system of a number and to inform the system of a restaurant name. These dialogue acts 608 are indicated in the form of the system dialogue act vector $a^t$. Note that the parameters of the dialogue acts 608 represent the semantic types of the slots tagged as slots 604, so that the content of the identified slots provides the information corresponding to the dialogue acts 608.

Figure 7:
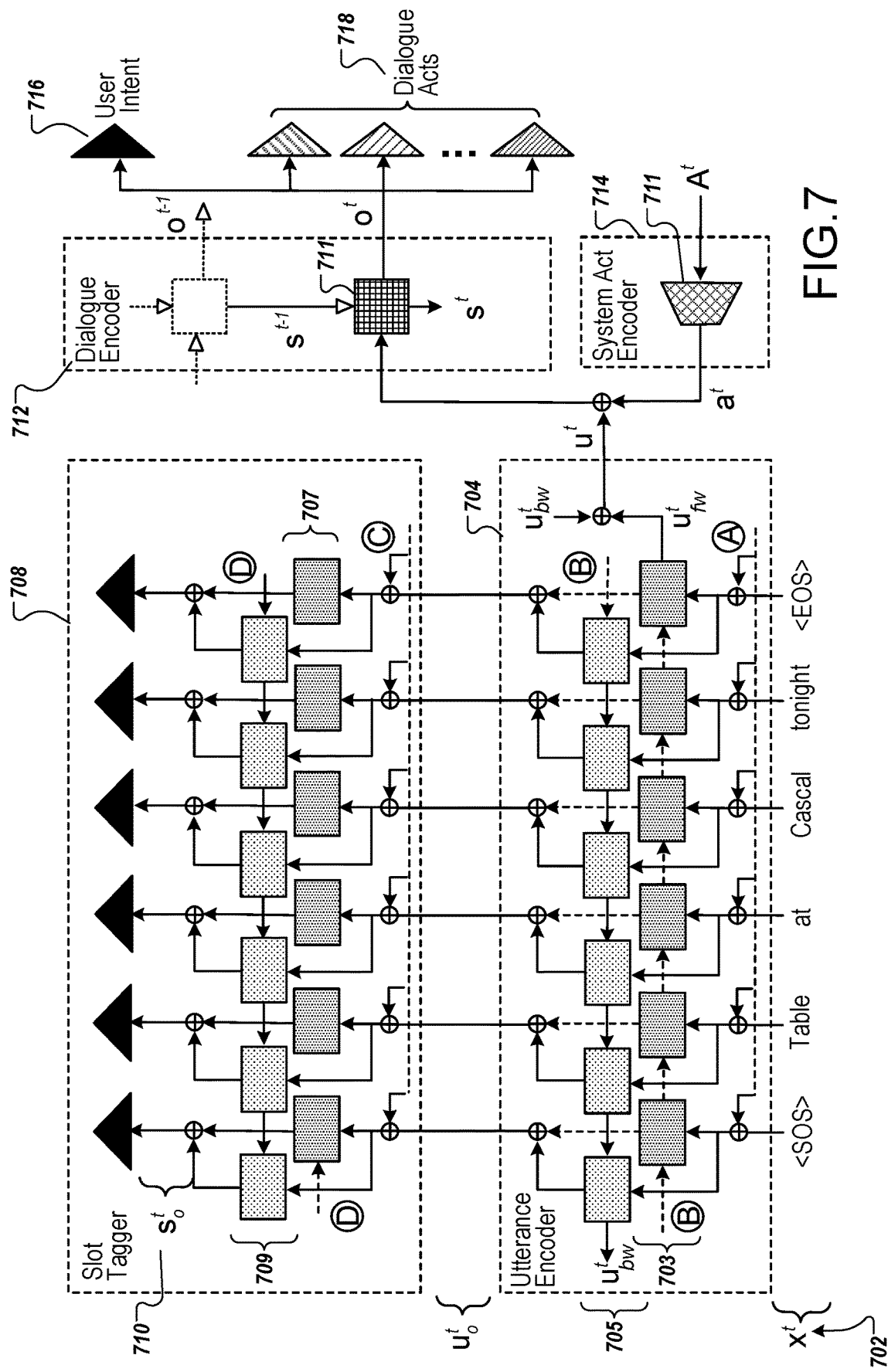
FIG. 7 illustrates another example of a system for a joint language understanding component and a dialogue state tracking component.

FIG. 7 illustrates another example of a system 700 for a joint language understanding component and a dialogue state tracking component. System 700 is similar to system 400. System 700 includes an utterance encoder 704, a slot tagger 708, a system act encoder 714, and a dialogue encoder 712. For each received utterance $x^t$ 702, the system act encoder 714 obtains a vector representation $a^t$ of all system dialogue acts $A^t$. In addition, the utterance encoder 704 generates the user utterance encoding $u^t$ by processing the user utterance token embeddings $x^t$. The utterance encoder 704 includes a single layer bi-direction GRU recurrent neural network (RNN) that includes a forward layer 703 and a backward layer 705. As shown in system 700, the forward layer 703 includes one or more similarly shaded blocks and the backward layer 705 includes one or more similarly shaded blocks.

The dialogue encoder 712 generates a context vector $o_t$ and updates its hidden state $s^t$ by summarizing the content of the received dialogue, including the received utterance $x^t$ 702, using $a^t$, $u^t$, and the dialogue encoder 712's previous hidden state $s^{t-1}$. Next, the dialogue context vector $o^t$ is then provided to the user intent classifier 420 and the dialogue act classifier 418. The utterance encoder 704 then generates updated token embeddings $u_o^t$ 706. The updated token embeddings $u_o^t$ 706 are provided from the utterance encoder 704 to the slot tagger 708 to identify the slot values present in the user utterance $x^t$ 702.

The utterance encoder 706 and the slot tagger 708 utilize a bidirectional RNNs. In addition to the inputs, both RNNs allow for additional inputs, such as the positions showed by A and C in FIG. 7, and external initialization of hidden states for forward and backward RNNs, such as the positions showed by B and D in FIG. 7. The slot tagger 708 consists of a single-layer bidirectional LSTM RNN to generate the refined token embeddings. The slot tagger 708 includes forward LSTM recurrent units 707 and backward LSTM recurrent units 709. As shown in system 700, the forward LSTM recurrent units 707 include one or more similarly shaded blocks and the backward LSTM recurrent units 709 include one or more similarly shaded blocks.

System 700 is similar to system 400, but system 700 shows a more generalized framework. Both systems 400, 700 include an utterance encoder, a slot tagger, and a system act encoder. The dialogue encoder 712 is similar to the state encoder 412, with similar inputs and outputs. The dialogue encoder 712 includes a unidirectional GRU RNN 711 that generates the dialogue context vector $O^t$. System 700 does not show further processing of the encoded representation of the dialogue context $O^t$ that is output by the dialogue encoder 712. Nevertheless, the dialogue server 106 may provide the dialogue context $O^t$ (as well as prior dialogue context $O^{t-1}$ and earlier) to a classifier such as user intent classifier 420 to generate a user intent 716, and to a classifier such as the dialogue act classifier 418 to determine the dialogue acts 718. In other implementations, classification functions to select or infer the user intent 716 and dialogue acts 718 can be integrated into the dialogue encoder 712.

Task-oriented dialogue systems interact with users in natural language environments to accomplish tasks they have in mind, by providing a natural language interface to a backend (API, database or service). These approaches to task-oriented dialogue systems typically include a language understanding (LU) component, which estimates the semantic parse of each user utterance and a dialogue state tracking (DST) or belief tracking component, which keeps track of the conversation context and the dialogue state (DS). Typically, DST uses the semantic parse generated by LU to update the DS at every dialogue turn. The DS accumulates the preferences specified by the user over the dialogue and is used to make requests to a backend. The results from the backend and the dialogue state are then used by a dialogue policy module to generate the next system response.

Pipelining dialogue system components often leads to error propagation, hence joint modeling of these components has recently gained popularity, owing to computational efficiency as well as the potential ability to recover from errors introduced by LU. However, combining joint modeling with the ability to scale to multiple domains and handle slots with a large set of possible values, potentially containing entities not seen during training, are active areas of research.

A single, joint model for LU and DST trained with multi-task learning is described throughout. This single, joint model employs a hierarchical recurrent neural network to encode the dialogue context. Intermediate feature representations from this network are used for identifying the intent and dialogue acts, and tagging slots in the user utterance. Slot values obtained using these slot tags (as shown in FIG. 4) are then used to update the set of candidate values for each slot. These candidate values are then scored by a recurrent scoring network which is shared across all slots, thus giving an efficient model for DST which can handle new entities that are not present in the training set—i.e., out-of-vocabulary (OOV) slot values.

During inference, the model uses its own predicted slot tags and previous turn dialogue state. However, ground truth slot tags and dialogue state are used for training to ensure stability. Aiming to bridge this gap between training and inference, a scheduled sampling approach to joint language understanding and dialogue state tracking is described.

The architecture of the dialogue encoder will be described below, which encodes the dialogue turns to be used as features by different tasks in our framework. This description also defines and outlines the implementation of the LU and DST tasks. Scheduled sampling, experiments, and discussion of results are also described.

The initial motivation for dialogue state tracking came from the uncertainty in speech recognition, as well as to provide a comprehensive input to a downstream dialogue policy component deciding the next system action. Proposed belief tracking models have ranged from rule-based, to generative, discriminative, other maximum entropy models, and web-style ranking.

Language understanding has commonly been modeled as a combination of intent and dialogue act classification and slot tagging. Recently, recurrent neural network (RNN) based approaches have shown good results for LU, such as using a joint RNN for intents, acts and slots to achieve better overall frame accuracy. In addition, some models further improve LU results by incorporating context from dialogue history.

In some implementations, a single joint model is proposed for single-turn LU and multi-turn DST to improve belief tracking performance. However, this single joint model relied on manually constructed semantic dictionaries to identify alternative mentions of ontology items that vary lexically or morphologically. Such an approach is not scalable to more complex domains as it is challenging to construct semantic dictionaries that can cover all possible entity mentions that occur naturally in a variety of forms in natural language. Other approaches proposed the NBT model which eliminates the LU step by directly operating on the user utterance. However, the NBT model approach requires iterating through the set of all possible values for a slot, which could be large or potentially unbounded (e.g., date, time, usernames, etc.). Other models incorporated end-to-end memory networks into state tracking and proposed an end-to-end model for belief tracking. However, the end-to-end memory networks and end-to-end model for belief tracking cannot accommodate out of vocabulary (OOV) slot values as they represent dialogue states as a distribution over all possible slot values seen in the training set.

To handle large value sets and OOV slot values, some models include an approach where a set of value candidates is formed at each turn using dialogue context. The DST then operates on this set of candidates. In some implementations, joint modeling of LU and DST, including sampling methods for training LU and DST jointly is included in these models.

Let a dialogue include a sequence of T turns between a client device and a dialogue server 106, each turn containing a user utterance and the preceding system dialogue acts output by the dialogue manager. FIG. 4 gives an overview of our model architecture, which includes a user utterance encoder, a system act encoder, a state encoder, a slot tagger and a candidate scorer. At each turn $t \in \{1, \ldots, T\}$, the model takes a dialogue turn and the previous dialogue state $D^{t-1}$ as input and outputs the predicted user intent, user dialogue acts, slot values in the user utterance and the updated dialogue state $D^t$.

As a new turn arrives, the system act encoder 416 encodes all system dialogue acts in the turn to generate the system dialogue act vector $a^t$. Similarly, the utterance encoder 404 encodes the user utterance into a vector $u_e^t$, and also generates contextual token embeddings $u_o^t$ for each utterance token. The state encoder 412 then uses $a^t$, $u_e^t$ and its previous turn hidden state, $d_{st}^{t-1}$, to generate the dialogue context vector $d_o^t$, which summarizes the entire observed dialogue, and its updated hidden state $d_{st}^t$.

The dialogue context vector $d_o^t$ is then used by the user intent classifier 420 and user dialogue act classifier 418. The slot tagger 408 uses the dialogue context from previous turn $d_o^{t-1}$, the system act vector $a^t$ and contextual token embeddings $u_o^t$ to generate refined contextual token embeddings $s_o^t$. These refined token embeddings are then used to predict the slot tag for each token in the user utterance The system dialogue acts and predicted slot tags are then used to update the set of candidate values for each slot. The candidate scorer 414 then uses the previous dialogue state $D^{t-1}$, the dialogue context vector $d_o^t$ and other features extracted from the current turn (indicated by blue arrows in FIG. 4) to update the scores for all candidates in the candidate set and outputs the updated dialogue state $D^t$. The following sections describe these components in detail.

Previous turn system dialogue acts play an important role in accurate semantic parsing of a user utterance. Each system dialogue act contains an act type and optional slot and value parameters. The dialogue acts are first encoded into binary vectors denoting the presence of an act type. All dialogue which don't have any associated parameters (e.g., greeting and negate) are encoded as a binary indicator vector $a_{utt}^t$. Dialogue acts with just a slots as parameter (e.g., request(date)) are encoded as $a_{slot}^t(s)$, whereas acts having a candidate value c for a slots as parameter (e.g., offer(time=7 μm)) are encoded as $a_{cand}^t(s, c)$. These binary vectors are then combined using equations 1-4 to obtain the combined system act representation $a^t$, which is used by other units of dialogue encoder (as shown in FIG. 4). In these equations, $e_s$ is a trainable slot embedding defined for each slot s.

$$a_{sc}^t(s) = a_{slot}^t(s) \oplus e_s \oplus \sum_c a_{cand}^t(s, c) \quad (1)$$

$$a_{sc}''(s) = ReLU(W_{sc}^a \cdot a_{sc}^t(s) + b_{sc}^a) \quad (2)$$

$$a_{usc}^t = \left(\frac{1}{|S^t|}\sum_{s \in S^t} a_{sc}''(s)\right) \oplus a_{utt}^t \quad (3)$$

$$a^t = ReLU(W_{usc}^a \cdot a_{usc}^t + b_{usc}^a) \quad (4)$$

The utterance encoder takes the tokens corresponding to the user utterance as input. Special tokens SOS and EOS are added at the beginning and end of the token list. Let $x^t = \{x_m^t \in \mathbb{R}^{u_d}, \forall 0 \leq m < M^t\}$ denote the embedded representations of these tokens, where $M^t$ is the number of tokens in the user utterance for turn t (including SOS and EOS).

A single layer bi-directional GRU recurrent neural network with state size $d_u$ and initial state set to 0 is used to encode the user utterance. The first output of the user utterance encoder is $u_e^t \in \mathbb{R}^{2d_u}$, which is a compact representation of the entire user utterance, defined as the concatenation of the final states of the two RNNs. The second output is $u_o^t = \{u_{o,m}^t \in \mathbb{R}^{2d_u}, 0 \leq m < M^t$, which is the embedded representation of each token conditioned on the entire utterance, defined as the concatenation of outputs at each step of the forward and backwards RNNs.

The state encoder completes the hierarchical dialogue encoder. At turn t, the state encoder generates $d_o^t$, which is an embedded representation of the dialogue context until and including turn t. The state encoder is implemented using a unidirectional GRU RNN with each timestep corresponding to a dialogue turn. As shown in FIG. 4, the dialogue encoder takes $a^t \oplus u_e^t$ and its previous hidden state $d_{st}^{t-1}$ as input and outputs the updated hidden state $d_{st}^t$ and the encoded representation of the dialogue context $d_o^t$ (which are the same in case of GRU).

The user intent is used to identify the backend with which the dialogue system should interact. The intents are predicted at each turn to allow a user to switch intents during the dialogue. However, it is assumed that a given user utterance can contain at most one intent and model intent prediction as a multi-class classification problem. At each turn, the distribution over all intents is calculated with the following equation:

$$p_i^t = \text{softmax}(W_i \cdot d_o^t + b_i) \quad (5)$$

where $\dim(p_i^t) = |I|$, $W_i \in \mathbb{R}^{d \times |I|}$ and $b_i \in \mathbb{R}^{|I|}$, I denoting the user intent vocabulary and $d = \dim(d_o^t)$. During inference, we predict $\text{argmax}(p_i^t)$ as the intent label for the utterance.

Dialogue acts are structured semantic representations of user utterances. User dialogue acts are used by the dialogue manager in deciding the next system action. User dialogue act classification is modeled as a multilabel classification problem, to allow for the presence of more than one dialogue act in a turn. At each turn, the probability for act a is predicted as, $$p_a^t = \text{sigmoid}(W_a \cdot d_o^t + b_a) \quad (6)$$

where $\dim(p_a^t)=|A_u|$, $W_a \in \mathbb{R}^{d \times |A_u|}$, $b_a \in \mathbb{R}^{|A_u|}$, $A_u$ is the user dialogue at vocabulary and $d=\dim(d_o^t)$. For each act $\alpha$, $p_\alpha^t(\alpha)$ is interpreted as the probability of presence of $\alpha$ in turn t. During inference, all dialogue acts with a probability greater than $t_u$ are predicted, where $0 < t_u < 1.0$ is a hyperparameter tuned using the dev set.

Slot tagging is the task of identifying the presence of values of different slots in the user utterance. The IOB tagging scheme is used to assign a label to each token. These labels are then used to extract the values for different slots from the utterance.

The slot tagging network consists of a single-layer bidirectional LSTM RNN, which takes the contextual token embeddings $u_o^t$ generated by the utterance encoder as input. It outputs refined token embeddings $s_o^t = \{s_{o,m}^t, \forall 0 \leq m < M^t\}$ for each token, $M^t$ being the number of tokens in user utterance at turn t.

Models making use of dialogue context for LU have been shown to achieve superior performance. In this setup, the dialogue context vector $d_o^{t-1}$ encodes all the preceding turns and the system act vector $a^t$ encodes the system dialogue acts preceding the user utterance. As shown in FIG. 4, $d_o^{t-1}$ is used to initialize (after projection to the appropriate dimension) the hidden state (cell states are initialized to zero) for the forward and backward LSTM recurrent units in the slot tagger, while $a^t$ is fed as input to the tagger by concatenating with each element of $u_o^t$ as shown below. An LSTM is used instead of a GRU for this layer since that resulted in better performance on the validation set.

$$s_{in}^t = \{u_{(o,m)}^t \oplus a^t, \forall 0 \leq m < M^t\} \quad (7)$$

$$s_{e,bw}^t, s_{o,bw}^t = LSTM_{bw}(s_{in}^t) \quad (8)$$

$$s_{e,fw}^f, s_{o,fw}^t = LSTM_{fw}(s_{in}^t) \quad (9)$$

$$s_o^t = s_{o,fw}^t \oplus s_{o,bw}^t \quad (10)$$

Let S be the set of all slots in the dataset. A set of $2|S|+1$ labels is defined (one B- and I-label for each slot and a single O label) for IOB tagging. The refined token embedding $s_{o,m}^t$ is used to predict the distribution across all IOB labels for token at index m as, $$p_{s,m}^t = \text{softmax}(W_s * s_{o,m}^t + b_s) \quad (11)$$

where $\dim(p_{s,m}^t) = 2|S|+1$, $W_s \in \mathbb{R}^{d_s \times 2|S|+1}$ and $b_s \in \mathbb{R}^{2|S|+1}$, $d_s = \dim(s_{o,m}^t)$ is the output size of slot tagger LSTM. During interference, $\text{argmax}(p_{s,m}^t)$ is predicted as the slow label for the $m^{th}$ token in the user utterance in turn t.

A candidate set $C_s^t$ is defined as a set of values of a slot s which have been mentioned by either the user or the system till turn t. In some implementations, a proposed use of candidate sets in DST efficiently handles slots with a large set of values. The candidate set is updated at every turn to include new values and discard old values when it reaches its maximum capacity. The dialogue state is represented as a set of distributions over value set $V_s^t = C_s^t \cup \{\delta, \phi\}$ for each slot $s \in S^t$, where $\delta$ and $\phi$ are special values dontcare (user is ok with any value for the slot) and null (slot not specified yet) respectively, and $S^t$ is the set of all slots that have been mentioned either by the user or the system till turn t.

The model described throughout uses the same definition and update rule for candidate sets. At each turn, the predictions of the slot tagger and system acts are used for having slot and value parameters to update the corresponding candidate sets. All candidate sets are padded with dummy values for batching computations for all slots together. Valid candidates are kept track of by defining indicator features $m_v^t(s, c)$ for each candidate, which take the value 1.0 if candidate is valid or 0.0 if not.

The candidate scorer predicts the dialogue state by updating the distribution over the value set $V_s^t$ for each slot $s \in S^t$. For this, we define three intermediate features $r_{utt}^t$, $r_{slot}^t$, and $r_{cand}^t(s, c)$. $r_{utt}^t$ is shared across all value sets and is defined by equation 12. $r_{slot}^t(s)$ is used to update scores for $V_s^t$ and is defined by equation 13. Furthermore, $r_{cand}^t(s, c)$ is defined for each candidate $c \in C_s^t \in V_s^t$ using equation 14 and contains all features that are associated to candidate c of slot s.

$$r_{utt}^t = d_o^t \oplus a_{utt}^t \quad (12)$$

$$r_{slot}^t(s) = a_{slot}^t(s) \oplus [p_\delta^{t-1}(s), p_\phi^{t-1}(s)] \quad (13)$$

$$r_{cand}^t(s, c) = a_{cand}^t(s, c) \oplus [p_c^{t-1}(s)] \oplus [m_v^t(s, c), m_u^t(c)] \quad (14)$$

In the above equations, $d_o^t$ is the dialogue context at turn t output by the state encoder, $a_{utt}^t$, $a_{slot}^t(s)$, and $a_{cand}^t(s, c)$ are system act encodings generated by the system act encoder, $p_\delta^{t-1}(s)$ and $p_\phi^{t-1}(s)$ are the scores associated with dontcare and null values for slots respectively. $p_c^{t-1}(s)$ is the score associated with candidate c of slots in the previous turn and is taken to be 0 if $c \notin C_s^t$. $m_v^t(s, c)$ are variables indicating whether a candidate is valid or padded. Another indicator feature $m_u^t(c)$ is defined which takes the value 1.0 if the candidate is a substring of the user utterance in turn t or 0.0 otherwise. This informs the candidate scorer which candidates have been mentioned most recently by the user.

$$r_{slot}^{\prime t}(s) = r_{utt}^t \oplus r_{slot}^t(s) \quad (15)$$

$$l_s^t(\delta) = FF_{cs}^1(r_{slot}^{\prime t}(s)) \quad (16)$$

$$l_s^t(c) = FF_{cs}^2(r_{slot}^{\prime t}(s) \oplus r_{cand}^t(s, c)) \quad (17)$$

$$p_s^t = \text{softmax}(l_s^t) \quad (18)$$

Features used in Equations 12-14 are then used to obtain the distribution over $V_s^t$ using Equations 15-17. In the above equations, $l_s^t(\delta)$ denotes the logit for dontcare value for slot s, $l_s^t(\delta)$ denotes the logit for a candidate $c \in C_s^t$ and $l_s^t(q)$ is a trainable parameter. These logits are obtained by processing the corresponding features using feed-forward neural networks $FF_{cs}^1$ and $FF_{cs}^2$, each having one hidden layer. The output dimension of these networks is 1 and the dimension of the hidden layer is taken to be half of the input dimension. The logits are then normalized using softmax to get the distribution $p_s^t$ over $V_s^t$.

DST is a recurrent model which uses predictions from the previous turn. For stability during training, ground truth predictions from the previous turn are used. This causes a mismatch between training and inference behavior. Scheduled sampling is used to bridge this mismatch. Scheduled sampling has been shown to achieve improved slot tagging performance on single turn datasets. FIG. 5 shows the setup for scheduled sampling for DST, which is carried out at two different locations-slot tags and dialogue state.

The performance of slot tagger is critical to DST because any slot value missed by the slot tagger will not be added to the candidate set (unless it is tagged in another utterance or present in any system act). To account for this, during training, sampling between the ground truth slot tags ($\bar{c}_u^t$)

and the predicted slot tags ($c_u^t$) is used, training initially with $\bar{c}_u^t$ (i.e. with keeping probability $p_c$=1) but gradually reducing $p_c$ i.e. increasingly replacing $\bar{c}_u^t$ with $c_u^t$. Using predicted slot tags during training allows DST to train in presence of noisy candidate sets.

During inference, the candidate scorer only has access to its own predicted scores in the previous turn (Equations 13 and 14). To better mimic this setup during training, ground truth previous scores taken from $\bar{D}^{t-1}$ (i.e. with keep probability $p_D$=1) is first used and gradually switching to $D^{t-1}$, the predicted previous scores, reducing $p_D$.

Both $p_c$ and $p_D$ vary as a function of the training step k, as shown in the right part of FIG. 5; only ground truth slot tags and dialogue state are used for training i.e. $p_c$ and $p_D$ stay at 1.0 for the first $k_{pre}$ training steps, and then decreasing linearly as the ground truth slot tags and state are increasingly replaced by model predictions during training.

The major contributions here are two-fold. First, hypothesizing that joint modeling of LU and DST results in a computationally efficient model with fewer parameters without compromising performance. Second, the use of scheduled sampling to improve the robustness of DST during interference.

Separate vs Joint LU-DST—FIG. 4 shows the joint LU-DST setup where parameters in the utterance encoder and state encoder are shared across LU tasks (intent classification, dialogue act classification and slot tagging) and DST (candidate scoring). As baselines, LU and DST tasks use separate parameters for utterance and state encoders.

Scheduled Sampling—scheduled sampling experiments are conducted in four different setups.

None—Ground truth slot tags ($\bar{c}_u^t$) and previous dialogue state ($\bar{D}^{t-1}$) are used for training.

Tags—Model samples between ground truth ($\bar{c}_u^t$) and predicted ($c_u^t$) slot tags, sticking to ground truth previous state.

State—Model samples between ground truth ($\bar{D}^{t-1}$) and predicted ($D^{t-1}$) previous state, sticking to ground truth slot tags.

Both—Model samples between $\bar{D}^{t-1}$ and $D^{t-1}$ as well as between $\bar{c}_u^t$ and $c_u^t$.

In the last three setups, sampling from predictions only after $k_{pre}$=0.3$k_{max}$ training steps, as shown in FIG. 5.

User intent classification accuracy is reported, F1 score for user dialogue act classification, frame accuracy for slot tagging and joint goal accuracy and slot F1 score for DST. During DST evaluation, the predicted slot values and the dialogue state are always used in the previous turn. Slot frame accuracy is defined as the fraction of turns for which all slot labels are predicted correctly. Similarly, joint goal accuracy is the fraction of turns for which the predicted and ground truth dialogue state match for all slots. Since it is a stricter metric than DST slot F1, it is used as the primary metric to identify the best set of parameters on the validation set.

Two datasets are used with the model. The first is Simulated Dialogues—The dataset contains dialogues from restaurant (Sim-R) and movie (Sim-M) domains across three intents. A challenging aspect of this dataset is the prevalence of OOV entities e.g. only 13% of the movie names in the dev/test sets also occur in the training data. The second is DSTC2—The top ASR hypothesis and system dialogue acts as inputs. Dialogue act labels are obtained from top SLU hypothesis and state labels for requestable slots. DS labels are obtained from state labels for informable slots. A semantic dictionary is used to obtain ground truth slot tags. The semantic dictionary is used to canonicalize the candidate values since the slot values in the dialogue state come from a fixed set in the DSTC2 dialogues and may be different from those present in the user utterance.

Sigmoid cross entropy loss for dialogue act classification and softmax cross entropy loss is used for all other tasks. During training, the sum of all task losses using ADAM optimizer is minimized for 100 k training steps with batches of 10 dialogues each. Grid-search to identify the best hyperparameter values (sampled within specified range) is used for learning rate (0.0001-0.005) and token embedding dimension (50-200). For scheduled sampling experiments, the minimum keep rate i.e. $p_{min}$ is varied between 0.1-0.9 with linear decay. The layer sizes for the utterance encoder and slot tagger are set equal to the token embedding dimension, and that of the state encoder to half this dimension.

Slot Value dropout—To make the model robust to OOV tokens arising from new entities not present in the training set, randomly replacing slot value tokens in the user utterance with a special OOV token with a probability that linearly increases from 0.0 to 0.4 during training is used.

Table 1 shows results across the two setups for the Simulated Dialogues datasets. For Sim-R+Sim-M, the joint LU-DST model with scheduled sampling (SS) on both slot tags and dialogue state performs the best, with a joint goal accuracy of 73.8% overall, while the best separate model gets a joint goal accuracy of 71.9%, using SS only for slot tags. Even for the no-SS baselines, the joint model performs comparably to the separate model (joint goal accuracies of 68.6% and 68.7% respectively), indicating that sharing results in a more efficient model with fewer parameters, without compromising overall performance. For each SS configuration, results comparing separate and joint modeling are statistically significant, as determined by the McNemar's test with $p<0.05$. On the Sim-R dataset, the best joint model obtains a joint goal accuracy of 87.10%, while the best separate model obtains 85.0%. However, a significant drop in joint goal accuracy for the Sim-M dataset for both the joint model and the separate model as compared to Sim-R is observed. This can partly be attributed to the Sim-M dataset being much smaller than Sim-R (384 training dialogues as opposed to 1116) and that the high OOV rate of the movie slot in Sim-M makes slot tagging performance more crucial for Sim-M. While SS does gently bridge the gap between training and testing conditions, its gains are obscured in this scenario possibly since it is very hard for DST to recover from a slot value being completely missed by LU, even when aided by SS.

For the two datasets, a significant difference is observed between the slot frame accuracy and joint goal accuracy. This is because an LU error penalizes the slot frame accuracy for a single turn, whereas an error in dialogue state propagates through all the successive turns, thereby drastically reducing the joint goal accuracy. This gap is even more pronounced for Sim-M because of the poor performance of slot tagger on movie slot, which is often mentioned by the user in the beginning of the dialogue. The relatively high values of overall DST slot F1 for Sim-M for all experiments also corroborates this observation.

TABLE 1

Experiments and results on test set with variants of scheduled sampling on separate and joint LU-DST models, when trained on Sim-M + Sim-R.

| Eval Set | SS Setup | Intent Accuracy Sep | Intent Accuracy Joint | Dialogue Act F1 Score Sep | Dialogue Act F1 Score Joint | Slot Frame Accuracy Sep | Slot Frame Accuracy Joint | Joint Goal Accuracy Sep | Joint Goal Accuracy Joint | DST Slot F1 Score Sep | DST Slot F1 Score Joint |
|---|---|---|---|---|---|---|---|---|---|---|---|
| Sim-R | None | 0.999 | 0.997 | 0.956 | 0.935 | 0.924 | 0.919 | 0.850 | 0.846 | 0.951 | 0.952 |
|  | Tags | 0.998 | 0.998 | 0.936 | 0.957 | 0.917 | 0.922 | 0.805 | 0.871 | 0.936 | 0.962 |
|  | State | 0.999 | 0.998 | 0.931 | 0.939 | 0.919 | 0.920 | 0.829 | 0.852 | 0.935 | 0.951 |
|  | Both | 0.994 | 0.998 | 0.948 | 0.919 | 0.917 | 0.916 | 0.829 | 0.849 | 0.942 | 0.953 |
| Sim-M | None | 0.991 | 0.993 | 0.966 | 0.966 | 0.801 | 0.800 | 0.276 | 0.283 | 0.806 | 0.817 |
|  | Tags | 0.993 | 0.994 | 0.970 | 0.967 | 0.895 | 0.801 | 0.504 | 0.262 | 0.839 | 0.805 |
|  | State | 0.996 | 0.970 | 0.964 | 0.955 | 0.848 | 0.799 | 0.384 | 0.266 | 0.803 | 0.797 |
|  | Both | 0.989 | 0.996 | 0.970 | 0.959 | 0.887 | 0.860 | 0.438 | 0.460 | 0.805 | 0.845 |
| Sim-R + Sim-M | None | 0.996 | 0.996 | 0.959 | 0.944 | 0.890 | 0.885 | 0.687 | 0.686 | 0.902 | 0.906 |
|  | Tags | 0.996 | 0.997 | 0.946 | 0.960 | 0.910 | 0.888 | 0.719 | 0.698 | 0.902 | 0.905 |
|  | State | 0.996 | 0.990 | 0.940 | 0.943 | 0.899 | 0.886 | 0.702 | 0.683 | 0.897 | 0.899 |
|  | Both | 0.993 | 0.997 | 0.954 | 0.931 | 0.909 | 0.900 | 0.717 | 0.738 | 0.894 | 0.915 |

Table 2 shows results on the DSTC2 dataset, which contains dialogues in the restaurant domain. The joint model gets a joint goal accuracy of 65.0% on the test set, which goes up to 67.0% with SS on slot tags. Approaches like NBT or Hierarchical RNN are better suited for such datasets, where the set of all slot values are already known, thus eliminating the need for slot tagging. On the other hand, the setup using slot tagging for candidate generation, which allows it to scale to OOV entities and scalably handle slots with a large or unbounded set of possible values, at the cost of performance.

TABLE 2

Reported joint goal accuracy of model variants on the DSTC2 test set.

| Model | Separate | Joint |
|---|---|---|
| No SS | 0.661 | 0.650 |
| Tags only SS | 0.655 | 0.670 |
| State only SS | 0.661 | 0.660 |
| Tags + State SS | 0.656 | 0.658 |
| Liu and Lane 2017 | — | 0.73 |
| Mrkšić et al. 2017 | — | 0.734 |

Analyzing results for scheduled sampling, for almost all combinations of metrics, datasets and joint/separate model configurations, the best result is obtained using a model trained with some SS variant. For instance, for Sim-M, SS over slot tags and state increases joint goal accuracy significantly from 28.3% to 46.0% for joint model. SS on slot tags helps the most with Sim-R and DSTC2: the two datasets with the most data, and low OOV rates, while SS on both slot tags and dialogue state helps more on the smaller Sim-M. In addition, it was shown that slot value dropout (Section 5.3), improves LU as well as DST results consistently.

As discussed above, a joint model for language understanding (LU) and dialogue state tracking (DST) can be made computationally efficient by way of sharing feature extraction layers between LU and DST, while achieving an accuracy comparable to modeling them separately across multiple tasks. Also, the effectiveness of scheduled sampling on LU outputs and previous dialogue state as an effective way to simulate inference-time conditions during training for DST is demonstrated, which makes the model more robust to errors.

In task-oriented dialogue systems, spoken language understanding, or SLU, refers to the task of parsing natural language user utterances into semantic frames. Making use of context from prior dialogue history holds the key to more effective SLU. State of the art approaches to SLU use memory networks to encode context by processing multiple utterances from the dialogue at each turn, resulting in significant trade-offs between accuracy and computational efficiency. On the other hand, downstream components like the dialogue state tracker (DST) already keep track of the dialogue state, which can serve as a summary of the dialogue history. An efficient approach to encoding context from prior utterances for SLU is proposed. More specifically, the architecture includes a separate recurrent neural network (RNN) based encoding module that accumulates dialogue context to guide the frame parsing sub-tasks and can be shared between SLU and DST. In these experiments, the effectiveness of this approach on dialogues is demonstrated from two domains.

Task-oriented dialogue systems assist users with accomplishing tasks, such as making restaurant reservations or booking flights, by interacting with them in natural language. The capability to identify task-specific semantics is a key requirement for these systems. This is accomplished in the spoken language understanding (SLU) module, which typically parses natural language user utterances into semantic frames, composed of user intent, dialogue acts and slots, that can be processed by downstream dialogue system components. An example semantic frame is shown for a restaurant reservation query in FIG. 6.

Much prior research into SLU has focused on single-turn language understanding, where the system receives only the user utterance and, possibly, external contextual features such as knowledge base annotations and semantic context from the frame, as inputs. However, task-oriented dialogue commonly involves the user and the system indulging in multiple turns of back-and-forth conversation in order to achieve the user goal. Multi-turn SLU present different challenges, since the user and the system may refer to entities introduced in prior dialogue turns, introducing ambiguity. For example, depending on context, the user utterance "three" could indicate a date, time, number of tickets or restaurant rating. Context from previous user and system utterances in a multi-turn dialogue has been shown to be helpful in resolving these ambiguities. While initial work in this direction made use of only the previous system turn for context, the advent of deep learning techniques, and memory networks in particular, facilitated incorporating context from the complete dialogue history.

In essence, memory network-based approaches to multi-turn SLU store previous user and system utterances in memory, and at the current turn, encode these memory items into embeddings, using RNNs or otherwise. These memory embeddings are then aggregated to obtain the context vector which is used to condition the SLU output at the current turn. The aggregation of memory embeddings could use an attention mechanism based on cosine similarity with the user utterance embedding. Other approaches account for temporal order of utterances in the memory by using an RNN for aggregation or decaying attention weights with time.

Although they result in significant gains in performance, using memory networks for encoding context is not computationally efficient for two reasons. First, at each turn, they process multiple utterances from the history to obtain SLU output for a single user utterance. Secondly, dialogue context could potentially be gleaned from other existing dialogue system components such as the dialogue state tracker. Using a separate SLU specific network instead of reusing the context from DST duplicates computation. Furthermore, such approaches work with natural language representation of the system utterance to have a consistent representation with user turns, while ignoring the system dialogue acts, which contain the same information but are more structured and have a much smaller vocabulary.

In this work, we investigate some effective approaches to encoding dialogue context for SLU. The contributions are two-fold. First, an approach for proposing to encode system dialogue acts for SLU, substituting the use of system utterances, which allows reuse of the dialogue policy manager's output to obtain context. Second, efficient mechanism for encoding dialogue context is proposed using hierarchical recurrent neural networks which processes a single utterance at a time, yielding computational gains without compromising performance. This representation of dialogue context is similar to those used in dialogue state tracking models, thus enabling the sharing of context representation between SLU and DST.

Let a dialogue be a sequence of T turns, where each turn contains a user utterance $U^t$ and a set of dialogue acts $A^t$ corresponding to the preceding system utterance. FIG. 7 gives an overview of our model architecture. For a new turn t, we use the system act encoder 714 to obtain a vector representation $a^t$ of all system dialogue acts $A^t$. The shaded encoder 711 (a two-layer feedforward network) of the system act encoder 714 obtains the vector representation $a^t$ of all system dialogue acts $A^t$. We also use the utterance encoder to generate the user utterance encoding $u^t$ by processing the user utterance token embeddings $x^t$.

The dialogue encoder 712 summarizes the content of the dialogue by using $a^t$, $u^t$, and its previous hidden state $s^{t-1}$ to generate the dialogue context vector $o^t$, and also update its hidden state $s^t$. The dialogue context vector is then used for user intent classification and dialogue act classification. The utterance encoder 704 also generates updated token embeddings, which are used by the slot tagger 708 to identify the slot values present in the user utterance.

Both the utterance encoder 704 and slot tagger 708 make use of bidirectional RNNs. In addition to the inputs mentioned above, both RNNs allow for additional inputs (positions A and C in FIG. 7) and external initialization of hidden states for forward and backward RNNs (positions B and D in FIG. 7), to incorporate context in our model.

The system act encoder 714 encodes the set of dialogue acts $A^t$ at turn t into a vector $a^t$, which is invariant to the order in which acts appear as shown below. This is in contrast to any representation based on the system utterance, which would impose an ordering on the underlying system acts.

Dialogue acts are first encoded into binary indicator vectors denoting presence of act types, defining one vector $a_{slot}^t(s)$ for each slot type $s \in S$ (covering acts such as request(time), negate (time='6 pm')) and a single vector $a_{utt}^t$ for acts without any associated slots (e.g. greeting). For these vectors, $\dim(a_{utt}^t) = \dim(a_{slot}^t(s)) = |A_s|$, $A_s$ being the set of all system act types. Any slot values associated with the acts in this process are ignored. For each slot s, a trainable embedding vector $e_s$ is defined. These vectors are combined to obtain the final encoding $a^t$, as shown in equations 19-22. In these equations, $W_1^a$, $W_2^a$, $b_1^a$, and $b_2^a$ are trainable model parameters, in addition to slot embeddings $e_s$.

$$a_{slot}''^t(s) = a_{slot}^t(s) \oplus e_s \tag{19}$$

$$a_{slot}'''^t(s) = ReLU(W_1^a \cdot a_{slot}''^t(s) + b_1^a) \tag{20}$$

$$a_{comb}^t = \left(\frac{1}{|S^t|}\sum_{s \in S^t} a_{slot}'''^t(s)\right) \oplus a_{utt}^t \tag{21}$$

$$a^t = ReLU(W_2^a \cdot a_{comb}^t + b_2^a) \tag{22}$$

The user utterance encoder 704 takes in the list of user utterance tokens as input. Special tokens SOS and EOS are added at the begging and end of the token list. Let $x^t = \{x_m^t \in \mathbb{R}^{u_d}, \forall 0 \leq m < M^t\}$ denote the utterance token embeddings, $M^t$ being the number of tokens in the user utterance for turn t. We use a single layer bi-directional RNN using GRU cells with state size $d_u$ to encode the user utterance.

$$u^t, u_o^t = BRNN_{GRU}(x^t) \tag{23}$$

The outputs of the user utterance encoder $u^t \in \mathbb{R}^{2d_u}$ and $u_o^t = \{u_{o,m}^t \in \mathbb{R}^{2d_u}, 0 \leq m < M^t\}$ are embedded representations of the entire user utterance and the individual utterance tokens respectively. These are respectively obtained by concatenating the final states and the intermediate outputs of the forward and backward RNNs.

The dialogue encoder 712 incrementally generates the embedded representation of the dialogue context at every turn. The dialogue encoder includes a unidirectional GRU RNN, with each timestep corresponding to a dialogue turn. As shown in FIG. 7, the dialogue encoder 712 takes $a^t \oplus u^t$ and its previous state $s^{t-1}$ as inputs and outputs the updated state $s^t$ and the encoded representation of the dialogue context $o^t$ (identical for a GRU RNN). This method of encoding context is more efficient that other state of the art approaches like memory networks which process multiple utterances from the history to process each turn.

The user intent 716 helps to identify the APIs/databases which the dialogue system should interact with. Intents 716 are predicted at each turn so that a change of intent during the dialogue can be detected. It is assumed that each user utterance 702 contains a single intent and predicts the distribution over all intents at each turn, $p_i^t$, using equation 24. On the other hand, dialogue act classification is defined as a multi-label binary classification problem to model the presence of multiple dialogue acts in an utterance. Equation 25 is used to calculate $p_a^t$, where $p_a^t(k)$ is the probability of presence of dialogue act k in turn t.

$$p_i^t = softmax(W_i \cdot o^t + b_i) \tag{24}$$

$$p_a^t = sigmoid(W_a \cdot o^t + b_a) \tag{25}$$

In the above equations $\dim(p_i^t)=|I|$, $W_i \in \mathbb{R}^{d \times |I|}$, $W_a \in \mathbb{R}^{d \times |A_u|}$, $b_i \in \mathbb{R}^{|A_u|}$, $I$ and $A_u$ denoting the user intent and dialogue act vocabularies respectively and $d=\dim(o^t)$. During inference, $\text{argmax}(p_i^t)$ is predicted as the intent label and all dialogue acts with probability greater than $t_u$ are associated with the utterance, where $0 < t_u < 1.0$ is a hyperparameter tuned using the validation set.

Slot tagging is the task of identifying the values for different slots present in the user utterance. The IOB (inside-outside-begin) tagging scheme is used (FIG. 6) to assign a label to each token. The slot tagger takes the token embeddings output by the utterance encoder as input and encodes them using a bidirectional RNN using LSTM cell with hidden state size $d_s$ to generate token embeddings $s_o^t = \{s_{o,m}^t \in \mathbb{R}^{2d_s}, 0 \leq m < M^t\}$, $M^t$ being the number of user utterance tokens in turn t. An LSTM cell is used instead of a GRU because it provides better results on the validation set. For the $m^{th}$ token, the token vector $s_{o,m}^t$ is used to obtain the distribution across all $2|S|+1$ IOB slot labels using equation 26, $|S|$ being the total number of slot types. During inference, $\text{argmax}(p_{s,m}^t)$ is predicted as the slot label for the $m^{th}$ token.

$$p_{s,m}^t = \text{softmax}(W_s * s_{o,m}^t + b_s) \quad (26)$$

Two representations of dialogue context are used, the dialogue encoding vector $o^{t-1}$ encodes all turns prior to the current turn whereas the system intent vector $a^t$ encodes the system utterance from the current turn. Thus, $o^{t-1}$ and $a^t$ together encode the entire conversation observed till the user utterance. These vectors can be fed as inputs at multiple places in the SLU model. In this work, four positions are identified to feed context i.e. positions A through D in FIG. 7. Positions A and C feed context vectors as additional inputs at each RNN step whereas positions B and D use the context vectors to initialize the hidden state of the two RNNs after a linear projection to the hidden state dimension. The following configurations are used for integrating dialogue context:

$a^t$ only, No DE: $a_t$ is fed, the system act encoding, in one of positions A-D, omit the dialogue encoder, and instead use $u^t$, the utterance encoder's final state, for intent and act prediction. The best model for this configuration, as evaluated on the validation set, had $a^t$ fed in position B, and test set results for this model are reported in row 7 of Table 1.

$a^t$ only: $a_t$ is fed into the dialogue encoder, and to one of the positions A-D. Row 8 of Table 1 contains results for the best model for this configuration, which had $a_t$ fed in position D of the slot tagger.

$o^{t-1}$ only: $a_t$ is fed into the dialogue encoder and $o^{t-1}$, the dialogue encoding from the previous turn, into the slot tagger at positions C or D. Row 9 of Table 1 shows results for the best model with $o^{t-1}$ fed in position D.

$a^t$ and $o^{t-1}$: $a_t$ is fed into the dialogue encoder, $a^t$ to one of the positions A-D and $o^{t-1}$ independently into positions C or D, 8 combinations in total. Row 10 of Table 1 shows results for the best model with $a^t$ fed in position C and $o^{t-1}$ in position D.

For the experiments, dialogues are obtained from the Simulated Dialogues dataset. The dataset has dialogues from restaurant (Sim-R, 1116 training dialogues) and movie (Sim-M, 384 training dialogues) domains and a total of three intents. The dialogues in the dataset consist of 12 slot types and 21 user dialogue act types, with 2 slot types and 12 dialogue acts shared between Sim-R and Sim-M. One challenging aspect of this dataset is the prevalence of unseen entities. For instance, only 13% of the movie names in the validation and test sets are also present in the training dataset.

The models' performance is compared with the following four baseline models:

NoContext: A two-layer stacked bidirectional RNN using GRU and LSTM cells respectively, and no context.

PrevTurn: This is similar to the NoContext model with a different bidirectional GRU layer encoding the previous system turn, and this encoding being input to the slot tagging layer of encoder i.e. position C in FIG. 7.

MemNet: This system uses cosine attention. For this model, metrics are reported with models trained with memory sizes of 6 and 20 turns. Although being significantly slower, a memory size of 20 enables the model to use the entire dialogue history for most of the dialogues.

SDEN: This system uses a bidirectional GRU RNN for combining memory embeddings. Metrics are reported for models with memory sizes 6 and 20.

TABLE 1

SLU results on test sets with baselines and proposed architecture variants, when trained on Sim-M + Sim-R.

| | Config | | Sim-R Results | | | | Sim-M Results | | | | Overall Results | | | |
|---|---|---|---|---|---|---|---|---|---|---|---|---|---|---|
| Model | $a^t$ | $o^{t-1}$ | Intent Acc | Act F1 | Slot F1 | Frame Acc | Intent Acc | Act F1 | Slot F1 | Frame Acc | Intent Acc | Act F1 | Slot F1 | Frame Acc |
| 1. NoContext | — | — | 83.61 | 87.13 | 94.24 | 65.51 | 88.51 | 93.49 | 86.91 | 62.17 | 84.76 | 89.03 | 92.01 | 64.56 |
| 2. PrevTurn | — | — | 99.37 | 90.10 | 94.96 | 86.93 | 99.12 | 93.58 | 88.63 | 77.27 | 99.31 | 91.13 | 93.06 | 84.19 |
| 3. MemNet-6 | — | — | 99.75 | 92.90 | 94.42 | 88.33 | 99.12 | 95.71 | 89.76 | 79.11 | 99.68 | 93.74 | 93.03 | 85.71 |
| 4. MemNet-20 | — | — | 99.67 | 95.67 | 94.28 | 89.52 | 98.76 | 96.25 | 90.70 | 80.35 | 99.29 | 95.85 | 93.21 | 86.92 |
| 5. SDEN-6 | — | — | 99.76 | 93.14 | 95.83 | 88.74 | 99.74 | 95.02 | 88.60 | 79.11 | 99.76 | 93.70 | 93.66 | 86.01 |
| 6. SDEN-20 | — | — | 99.84 | 94.43 | 94.81 | 89.46 | 99.60 | 97.56 | 90.93 | 82.55 | 99.81 | 95.38 | 93.65 | 87.50 |
| 7. $a^t$ only, No DE | B | — | 99.62 | 93.21 | 95.53 | 87.63 | 99.12 | 96.00 | 87.30 | 75.44 | 99.48 | 94.04 | 93.07 | 84.17 |
| 8. $a^t$ only | D | — | 99.98 | 95.42 | 95.38 | 89.26 | 99.71 | 96.35 | 91.58 | 83.36 | 99.92 | 95.70 | 94.22 | 87.58 |
| 9. $o^{t-1}$ only | — | D | 99.83 | 94.44 | 94.18 | 87.63 | 99.27 | 96.66 | 91.88 | 86.80 | 99.67 | 95.11 | 93.46 | 87.40 |
| 10. $a^t$ and $o^{t-1}$ | C | D | 99.65 | 92.71 | 94.70 | 87.54 | 99.27 | 96.11 | 93.73 | 86.88 | 99.54 | 93.74 | 94.40 | 87.35 |

For each dataset, the columns indicate the intent accuracy, dialogue act F1 score, slot chunk F1 score and frame accuracy, in that order. The Config column indicates the best obtained configuration for feeding context vectors for each experiment.

Sigmoid cross entropy loss is used for dialogue act classification (since it is modeled as a multilabel binary classification problem) and softmax cross entropy loss is used for intent classification and slot tagging. During training, the sum of the three constituent losses are minimized using the ADAM optimizer for 150 k training steps with a batch size of 10 dialogues.

To improve model performance in the presence of out of vocabulary (OOV) tokens arising from entities not present in the training set, the dialogue server 106 randomly replace tokens corresponding to slot values in user utterance with a special OOV token with a value dropout probability that linearly increases during training.

To find the best hyperparameter values, the dialogue server 106 performs a grid search over the token embeddings dimension ($\in\{64, 128, 256\}$), learning rate (E [0.0001, 0.01]), maximum value dropout probability ($\in$[0.2, 0.5]) and the intent prediction threshold ($\in\{0.3, 0.4, 0.5\}$), for each model configuration. The layer sizes for the utterance encoder 704 and slot tagger 708 are set equal to the token embedding dimension, and that of the dialogue encoder to half this dimension.

In Table 1, four metrics are reported to indicate LU performance: the intent accuracy, the F1 score for dialogue acts, the slot chunk F1 score and the frame accuracy. A frame is considered correct if its predicted intent, and all the predicted slots and dialogue acts are correct. Frame accuracy is used on the combined validation set as the primary metric to identify the best set of parameters for each model configuration. Table 1 reports the evaluation metrics on the test set for these parameters.

Table 1 compares the baseline models with different variants of our model. It can be seen that the models compare favorably to the state of the art MemNet and SDEN baselines. Context plays a crucial role across all datasets and tasks, especially so for intent and dialogue act classification, giving an improvement of at least ~15% and ~5% respectively across all configurations using context. Additionally, for this dataset, it can be seen that the NoContext model in row 1 presents a strong baseline for the slot tagging task, but context-incorporating models still achieve noticeably better results for this task. For all subsequent discussion, frame accuracy is concentrated on since it summarizes the performance across all tasks.

An important consideration is the computational efficiency of the compared approaches: memory network-based models are much more computationally expensive, since they process multiple utterances from the dialogue history at every turn. In contrast, this approach only adds a two-layer feedforward network (the system act encoder) and one step of a GRU cell (for the dialogue encoder) per turn to encode all context. As far as performance is concerned, MemNet-6 and MemNet-20 experiments took roughly 4× and 12× more time to train respectively than this implementation's slowest model containing both the system act encoder and the dialogue encoder, on our training setup. SDEN runs are even slower than their MemNet counterparts since they use RNNs for combining memory embeddings. In addition to being fast, the models in this implementation generalize better on the smaller Sim-M dataset. This suggests that memory network-based models tend to be more data intensive.

Two interesting experiments to compare are rows 2 and 7, i.e. "PrevTurn" and "$a^t$ only, No DE", since they both use context only from the system utterance and acts respectively, while discarding the remaining turns. Our system act encoder, comprising only a two-layer feedforward network, is in principle much faster than the bidirectional GRU that "PrevTurn" uses to encode the system utterance. This notwithstanding, the similar performance of both these models suggests that the use of system dialogue acts for context is a more than viable alternative to using the corresponding system utterance.

Table 1 also lists the best configurations for feeding context vectors $a^t$ and $o^{t-1}$. In general, it is observed that feeding context vectors as initial states to bidirectional RNNs yields better results than feeding them as additional inputs at each RNN step. Another interesting observation is that using $o^{t-1}$ as compared to $a^t$ as additional context for the slot tagger does not improve the slot tagging performance for this dataset. This may be attributed to a strong correspondence between slots appearing in the system turn and the slots mentioned in the user utterance.

To conclude, in this work a fast and efficient approach is presented to encoding context for SLU. Avoiding the huge per-turn overhead of memory networks, this method accumulates dialogue context one turn at a time, resulting in a faster and more generalizable model without any loss in accuracy. This also demonstrate that using system dialogue acts is a computationally efficient alternative to using system utterance for context.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 8:
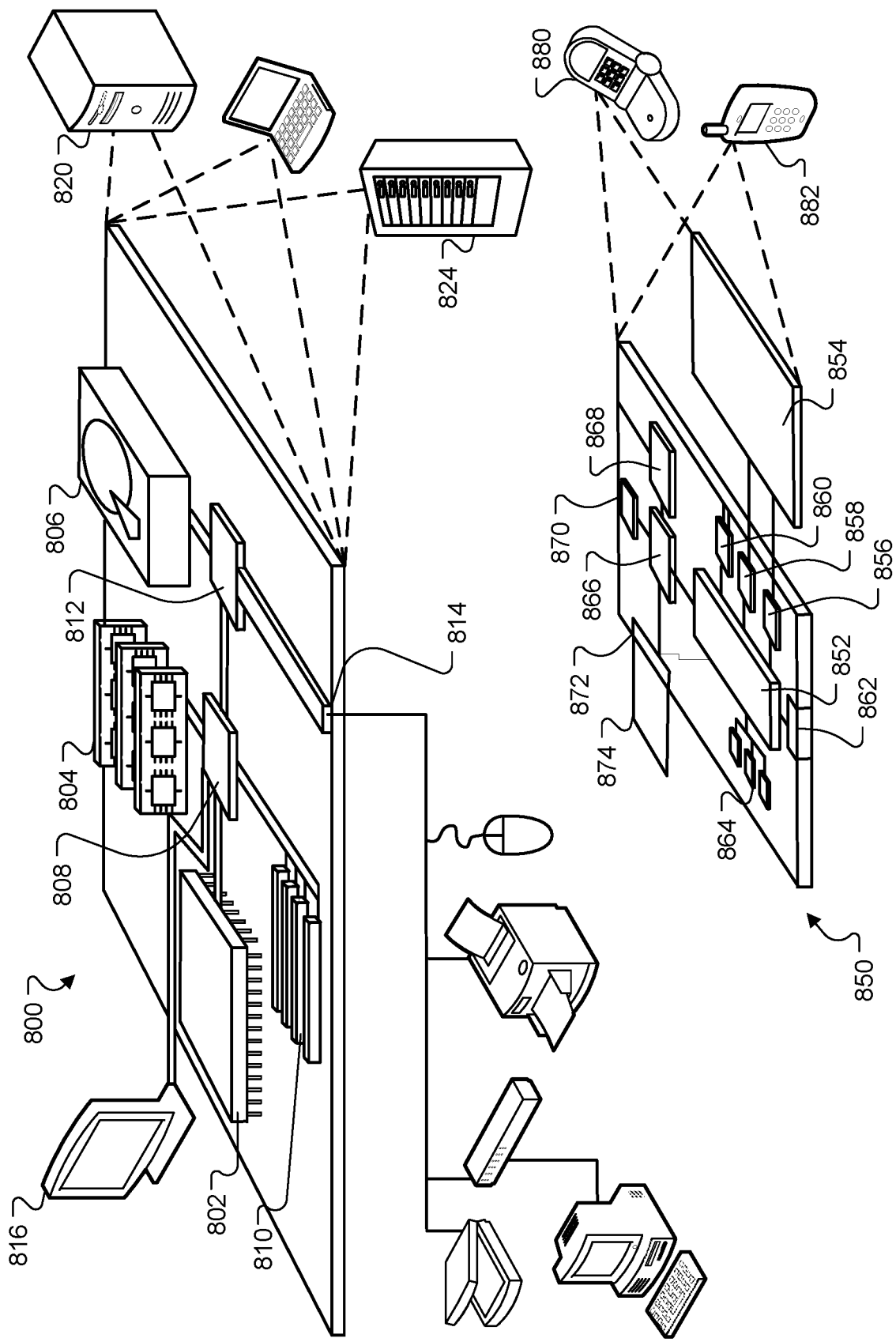
FIG. 8 shows an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers of a dialogue system, the method comprising:
obtaining, by the one or more computers of the dialogue system, a natural language input from a user, wherein the natural language input is part of a dialogue between the user and the dialogue system, wherein the dialogue system includes language understanding functionality and dialogue state tracking functionality, wherein the language understanding functionality is configured to parse natural language user utterances into semantic frames each having one or more user intents, one or more dialogue acts, and/or one or more slots, and wherein the dialogue state tracking functionality is configured to accumulate information about a history of the dialogue as the dialogue progresses and/or estimate a goal of a user given the history of the dialogue;
generating, by the one or more computers of the dialogue system, a dialogue context representation that represents one or more previous interactions in the dialogue;
using, by the one or more computers of the dialogue system, the dialogue context representation to identify a user intent and/or dialogue act for the natural language input;
determining, by the one or more computers of the dialogue system, semantic classifications for each of one or more elements of the natural language input; and
providing, by the one or more computers of the dialogue system, a response for output in response to the natural language input, the response being generated based on (i) the identified user intent and/or dialogue act and (ii) the semantic classifications for the one or more elements of the natural language input.

2. The method of claim 1, wherein the dialogue context representation is generated based on:
a previous action performed in the dialogue by the dialogue system;
one or more encodings determined based on the natural language input; and
an internal state of a dialogue state encoder that is updated at each dialogue turn.

3. The method of claim 1, comprising generating, using a slot tagger neural network, a set of output vectors based on input, to the slot tagger neural network, comprising (i) a system act encoding for a current dialogue turn which indicates a previous action performed in the dialogue by the dialogue system, (ii) token-level encodings based on different tokens of the natural language input, and (iii) a previous dialogue context representation for a previous turn of the dialogue that occurred before the natural language input was provided by the user; and
wherein the semantic classifications are determined based on the output vectors in the set of output vectors from the slot tagger neural network.

4. The method of claim 1, wherein the natural language input is a transcription of an utterance spoken by the user, and/or
wherein providing a response comprises providing a response for output as synthesized speech to the user.

5. The method of claim 1, wherein generating the dialogue context representation comprises generating a dialogue context vector using one or more neural networks;
wherein using the dialogue context representation to identify the user intent and/or dialogue act for the natural language input is performed using one or more neural networks; and/or
using, by the one or more computers of the dialogue system, the dialogue context representation to determine semantic classifications for the one or more elements of the natural language input is performed using one or more neural networks.

6. The method of claim 1, wherein the language understanding functionality and the dialogue state tracking functionality are configured to obtain features representing the natural language input from a same, shared encoder.

7. The method of claim 1, wherein the language understanding functionality and the dialogue state tracking functionality are configured to obtain the dialogue context representation representing a history of the dialogue from a same, shared dialogue state encoder.

8. The method of any of claim 1, wherein the language understanding functionality and the dialogue state tracking functionality respectively comprise neural network layers, wherein the neural network layers for the dialogue state tracking functionality are trained using scheduled sampling such that the dialogue state tracking functionality is trained using both ground truth results and outputs generated by the language understanding functionality during training.

9. The method of claim 1, further comprising:
tokenizing, by the one or more computers of the dialogue system, the natural language input to identify multiple tokens for the natural language input;
generating, by the one or more computers of the dialogue system, token-level encodings corresponding to different tokens of the natural language input, the token-level encodings being generated using an encoder comprising one or more recurrent neural network layers; and
generating, by the one or more computers of the dialogue system, a system action encoding from data indicating one or more system actions previously performed in the dialogue by the dialogue system, the system action encoding being generated using a system action encoder comprising one or more neural network layers;
wherein generating the dialogue context representation comprises generating, by the one or more computers of the dialogue system, a dialogue context vector based on one or more encodings for the natural language input and the system action encoding, the dialogue context vector being generated using a dialogue state encoder comprising one or more recurrent neural network layers.

10. The method of claim 1, comprising tokenizing, by the one or more computers of the dialogue system, the natural language input to identify multiple tokens for the natural language input;

wherein determining the semantic classifications comprises determining a semantic classification label for each of the multiple tokens, wherein one or more of the semantic classification labels indicates one of a predetermined set of types of fields or parameters used to respond to user inputs; and wherein the response is generated based on the semantic classification labels for the multiple tokens.

11. The method of claim 1, wherein the semantic classifications are determined based on a previous dialogue context representation for a previous turn of the dialogue that occurred before the natural language input was provided by the user.

12. The method of claim 11, wherein the semantic classifications are based on:
a previous action performed in the dialogue by the dialogue system;
one or more encodings determined based on the natural language input; and
the previous dialogue context representation.

13. The method of claim 1, comprising performing dialogue state tracking over a limited set of candidates using a dialogue state tracker comprising a multi-layer feedforward neural network.

14. The method of claim 13, wherein the dialogue state tracker is configured to receive, as input, (i) features corresponding to the natural language input as a whole, ii features corresponding to individual tokens of the natural language input, and (iii) features corresponding to individual candidate token classifications, and
wherein the features are extracted from (i) a dialogue context vector output by a dialogue state encoder for the natural language input and (ii) a dialogue state occurring prior to the natural language input, the dialogue state comprising a representation of parameters of a task to be completed.

15. The method of claim 1, comprising:
processing, by the one or more computers of the dialogue system, token-level utterance encodings, a system action encoding, and a dialogue context vector for a previous dialogue turn using a slot tagger comprising one or more recurrent neural network layers to produce token-level output vectors; and
determining, by the one or more computers of the dialogue system, a limited set of candidate token classifications for the tokens of the natural language input based on the token-level utterance encodings;
wherein providing the response comprises providing, by the one or more computers of the dialogue system, a response for output in response to the user utterance, the response being generated based on an interpretation of the natural language input determined using the limited set of candidate token classifications.

16. The method of claim 15, comprising:
processing, by the one or more computers of the dialogue system, the dialogue context vector using one or more classifiers to (i) select a user intent classification label from among a predetermined set of user intent classification labels and (ii) identify one or more dialogue acts represented by the natural language input; and
determining, by the one or more computers of the dialogue system, a first set of candidate token classifications for the natural language input based on token-level output vectors from the slot tagger.

17. The method of claim 16, wherein determining the limited set of candidate token classifications comprises determining, by the one or more computers of the dialogue system, a second set of candidate token classifications for the user utterance based on the first set of candidate tokens and context comprising previous user actions and previous system actions in the dialogue.

18. The method of claim 17, wherein the second set of candidate token classifications is determined further based on one or more knowledge sources external to the dialogue system.

19. A system comprising:
one or more computers of a dialogue system; and
one or more computer-readable media storing instructions that are operable, when executed by the one or more computers, to cause the one or more computers to perform operations comprising:
obtaining, by the one or more computers, a natural language input from a user, wherein the natural language input is part of a dialogue between the user and the dialogue system, wherein the dialogue system includes language understanding functionality and dialogue state tracking functionality, wherein the language understanding functionality is configured to parse natural language user utterances into semantic frames each having one or more user intents, one or more dialogue acts, and/or one or more slots, and wherein the dialogue state tracking functionality is configured to accumulate information about a history of the dialogue as the dialogue progresses and/or estimate a goal of a user given the history of the dialogue;
generating, by the one or more computers, a dialogue context representation that represents one or more previous interactions in the dialogue;
using, by the one or more computers, the dialogue context representation to identify a user intent and/or dialogue act for the natural language input;
determining, by the one or more computers, semantic classifications for each of one or more elements of the natural language input; and
providing, by the one or more computers, a response for output in response to the natural language input, the response being generated based on (i) the identified user intent and/or dialogue act and (ii) the semantic classifications for the one or more elements of the natural language input.

20. One or more non-transitory computer-readable media storing instructions that are operable, when executed by one or more computers of a dialogue system, to cause the one or more computers to perform operations comprising:
obtaining, by the one or more computers, a natural language input from a user, wherein the natural language input is part of a dialogue between the user and the dialogue system, wherein the dialogue system includes language understanding functionality and dialogue state tracking functionality, wherein the language understanding functionality is configured to parse natural language user utterances into semantic frames each having one or more user intents, one or more dialogue acts, and/or one or more slots, and wherein the dialogue state tracking functionality is configured to accumulate information about a history of the dialogue as the dialogue progresses and/or estimate a goal of a user given the history of the dialogue;
generating, by the one or more computers, a dialogue context representation that represents one or more previous interactions in the dialogue;

using, by the one or more computers, the dialogue context representation to identify a user intent and/or dialogue act for the natural language input;

determining, by the one or more computers, semantic classifications for each of one or more elements of the natural language input; and providing, by the one or more computers, a response for output in response to the natural language input, the response being generated based on (i) the identified user intent and/or dialogue act and (ii) the semantic classifications for the one or more elements of the natural language input.

\* \* \* \* \*